United States Patent
Cook et al.

(10) Patent No.: US 10,880,399 B2
(45) Date of Patent: *Dec. 29, 2020

(54) METHOD AND SYSTEM FOR IMPLEMENTING NETWORK EXPERIENCE SHIFTING USING SHARED OBJECTS

(71) Applicant: CenturyLInk Intellectual Property LLC, Broomfield, CO (US)

(72) Inventors: Charles I. Cook, Louisville, CO (US); Michael K. Bugenhagen, Leawood, KS (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/882,953

(22) Filed: May 26, 2020

(65) Prior Publication Data
US 2020/0287986 A1    Sep. 10, 2020

Related U.S. Application Data

(63) Continuation of application No. 15/962,195, filed on Apr. 25, 2018, now Pat. No. 10,673,978, which is a
(Continued)

(51) Int. Cl.
*G06F 15/173* (2006.01)
*H04L 29/08* (2006.01)
(Continued)

(52) U.S. Cl.
CPC ........ *H04L 67/306* (2013.01); *H04L 12/2854* (2013.01); *H04L 12/66* (2013.01);
(Continued)

(58) Field of Classification Search
CPC ..... H04L 67/306; H04L 63/102; H04L 63/08; H04L 12/2854; H04L 12/66; H04L 67/02;
(Continued)

(56) References Cited

U.S. PATENT DOCUMENTS

| 6,577,327 B1 | 6/2003 | Rochford et al. |
| 8,051,382 B1 | 11/2011 | Kingdom et al. |

(Continued)

FOREIGN PATENT DOCUMENTS

| WO | WO-2014110453 | 7/2014 |
| WO | WO-2014/150715 | 9/2014 |

(Continued)

OTHER PUBLICATIONS

"Broadband Access Service Attributes and Performance Metrics", Issue 1 Feb. 2015, 51 pgs.
(Continued)

*Primary Examiner* — Padma Mundur

(57) ABSTRACT

Novel tools and techniques are provided for implementing network experience shifting using shared objects. In various embodiments, a network node in a first network might receive, via a first network access device ("NAD") in a second network, a request from a first user device to establish roaming network access, a first user being associated with a second NAD in the first network and being unassociated with the first NAD. The network node might authenticate the first user, receive customer network telemetry data regarding visited LAN associated with the first NAD via a gateway API, receive service provider network telemetry data via a network API, determine whether the first user is associated with (and authorized to access services accessible by) the second NAD. If so, the network node might configure the visited LAN and/or the first NAD to simulate the interface environment of the user's home LAN and/or the second NAD.

17 Claims, 18 Drawing Sheets

Related U.S. Application Data continuation-in-part of application No. 15/793,124, filed on Oct. 25, 2017, now Pat. No. 10,693,977, said application No. 15/962,195 is a continuation-in-part of application No. 15/647,482, filed on Jul. 12, 2017, now Pat. No. 10,481,938, which is a continuation-in-part of application No. 15/148,721, filed on May 6, 2016, now Pat. No. 9,733,975.

(60) Provisional application No. 62/561,579, filed on Sep. 21, 2017, provisional application No. 62/482,021, filed on Apr. 5, 2017, provisional application No. 62/452,133, filed on Jan. 30, 2017, provisional application No. 62/299,346, filed on Feb. 24, 2016, provisional application No. 62/172,359, filed on Jun. 8, 2015, provisional application No. 62/159,788, filed on May 11, 2015, provisional application No. 62/157,795, filed on May 6, 2015.

(51) Int. Cl.
| | |
|---|---|
| H04L 12/28 | (2006.01) |
| H04L 12/66 | (2006.01) |
| H04L 29/06 | (2006.01) |
| H04W 48/00 | (2009.01) |
| H04W 24/02 | (2009.01) |
| H04W 84/12 | (2009.01) |
| H04L 12/24 | (2006.01) |

(52) U.S. Cl.
CPC ............ H04L 63/08 (2013.01); H04L 63/102 (2013.01); H04W 48/00 (2013.01); H04L 41/28 (2013.01); H04L 41/50 (2013.01); H04L 67/02 (2013.01); H04L 67/30 (2013.01); H04W 24/02 (2013.01); H04W 84/12 (2013.01)

(58) Field of Classification Search
CPC ......... H04L 67/30; H04L 41/50; H04L 41/28; H04W 48/00; H04W 24/02; H04W 84/12
See application file for complete search history.

(56) References Cited

U.S. PATENT DOCUMENTS

| | | | |
|---|---|---|---|
| 8,462,632 | B1 | 6/2013 | Vincent |
| 8,717,895 | B2 | 5/2014 | Koponen et al. |
| 9,141,416 | B2 | 9/2015 | Bugenhagen |
| 9,158,565 | B2 | 10/2015 | Jakoljevic et al. |
| 9,733,975 | B2 | 8/2017 | Cook et al. |
| 2003/0115291 | A1* | 6/2003 | Kendall ............... G06F 16/9535 709/219 |
| 2004/0015966 | A1 | 1/2004 | Macchiano et al. |
| 2005/0144288 | A1 | 6/2005 | En-Yi |
| 2006/0184998 | A1 | 8/2006 | Smith |
| 2006/0224669 | A1 | 10/2006 | Wouhaybi |
| 2006/0236095 | A1 | 10/2006 | Smith |
| 2007/0014306 | A1 | 1/2007 | Tirri |
| 2007/0115962 | A1 | 5/2007 | Mammoliti |
| 2007/0124406 | A1 | 5/2007 | Liu |
| 2007/0230358 | A1 | 10/2007 | Narayanan et al. |
| 2008/0002676 | A1 | 1/2008 | Wiley |
| 2008/0025321 | A1 | 1/2008 | Gudipudi |
| 2008/0043640 | A1 | 2/2008 | Smith |
| 2008/0049927 | A1 | 2/2008 | Wiley |
| 2008/0076413 | A1* | 3/2008 | Jones ................. H04L 63/0892 455/432.3 |
| 2008/0155423 | A1 | 6/2008 | Moran |
| 2008/0155537 | A1 | 6/2008 | Dinda et al. |
| 2009/0092151 | A1 | 4/2009 | Raguet et al. |
| 2009/0187654 | A1 | 7/2009 | Raja et al. |
| 2009/0290595 | A1 | 11/2009 | Celebioglu |
| 2009/0292858 | A1 | 11/2009 | Lambeth et al. |
| 2010/0023623 | A1 | 1/2010 | Saffre et al. |
| 2010/0080238 | A1 | 4/2010 | Allan |
| 2010/0122334 | A1 | 5/2010 | Stanzione et al. |
| 2010/0149999 | A1 | 6/2010 | Beattie |
| 2010/0162238 | A1 | 6/2010 | Warfield |
| 2010/0169780 | A1 | 7/2010 | Bryant-Rich |
| 2010/0177642 | A1 | 7/2010 | Sebastian |
| 2010/0192152 | A1 | 7/2010 | Miyamoto et al. |
| 2011/0209157 | A1 | 8/2011 | Sumida et al. |
| 2011/0222412 | A1 | 9/2011 | Kompella |
| 2011/0231551 | A1 | 9/2011 | Hassan et al. |
| 2011/0252418 | A1 | 10/2011 | Havivi et al. |
| 2011/0276951 | A1 | 11/2011 | Jain |
| 2011/0296234 | A1 | 12/2011 | Oshins et al. |
| 2011/0314469 | A1 | 12/2011 | Qian et al. |
| 2011/0317678 | A1 | 12/2011 | Allan et al. |
| 2012/0034916 | A1* | 2/2012 | Hu ......................... H04W 28/24 455/432.1 |
| 2012/0072564 | A1 | 3/2012 | Johnsen |
| 2012/0072909 | A1 | 3/2012 | Bilal Malik et al. |
| 2012/0167083 | A1 | 6/2012 | Suit |
| 2012/0174099 | A1 | 7/2012 | Ashok et al. |
| 2012/0233350 | A1 | 9/2012 | Unbehagen |
| 2012/0304175 | A1 | 11/2012 | Damola et al. |
| 2012/0331461 | A1 | 12/2012 | Fries et al. |
| 2013/0003538 | A1 | 1/2013 | Greenberg et al. |
| 2013/0031543 | A1 | 1/2013 | Angus |
| 2013/0058215 | A1 | 3/2013 | Koponen et al. |
| 2013/0061297 | A1 | 3/2013 | Larsen et al. |
| 2013/0191850 | A1 | 7/2013 | Fischer et al. |
| 2013/0204971 | A1 | 8/2013 | Brandwine et al. |
| 2013/0212600 | A1 | 8/2013 | Harsh et al. |
| 2013/0275968 | A1 | 10/2013 | Petev et al. |
| 2013/0332926 | A1 | 12/2013 | Jakoljevic et al. |
| 2014/0016924 | A1 | 1/2014 | Gonzalez |
| 2014/0112349 | A1 | 4/2014 | Moreno |
| 2014/0123140 | A1 | 5/2014 | Motoki |
| 2014/0164618 | A1 | 6/2014 | Alicherry et al. |
| 2014/0201374 | A1 | 7/2014 | Ashwood-Smith |
| 2014/0282528 | A1 | 9/2014 | Bugenhagen |
| 2014/0282529 | A1 | 9/2014 | Bugenhagen |
| 2014/0321260 | A1 | 10/2014 | Mishra et al. |
| 2014/0321298 | A1* | 10/2014 | Chow ................... H04L 41/083 370/252 |
| 2014/0347979 | A1 | 11/2014 | Tanaka |
| 2015/0049601 | A1 | 2/2015 | Bugenhagen |
| 2015/0052600 | A1 | 2/2015 | Weinsberg |
| 2015/0117454 | A1 | 4/2015 | Koponen et al. |
| 2015/0143368 | A1 | 5/2015 | Bugenhagen |
| 2015/0207699 | A1 | 7/2015 | Fargano et al. |
| 2015/0212856 | A1 | 7/2015 | Shanmuganathan et al. |
| 2015/0256357 | A1 | 9/2015 | Rajendran |
| 2015/0263946 | A1 | 9/2015 | Tubaltsev |
| 2015/0288541 | A1 | 10/2015 | Fargano et al. |
| 2015/0288622 | A1 | 10/2015 | Fargano et al. |
| 2015/0288767 | A1 | 10/2015 | Fargano et al. |
| 2015/0295750 | A1 | 10/2015 | Blanco |
| 2015/0324220 | A1 | 11/2015 | Bugenhagen |
| 2016/0006696 | A1 | 1/2016 | Donley et al. |
| 2016/0044035 | A1 | 2/2016 | Huang |
| 2016/0048403 | A1 | 2/2016 | Bugenhagen |
| 2016/0050159 | A1 | 2/2016 | Cook et al. |
| 2016/0329965 | A1 | 11/2016 | Cook et al. |
| 2016/0330074 | A1 | 11/2016 | Cook et al. |
| 2016/0330140 | A1 | 11/2016 | Cook et al. |
| 2016/0330613 | A1 | 11/2016 | Cook et al. |
| 2016/0335111 | A1 | 11/2016 | Bruun |
| 2016/0337206 | A1 | 11/2016 | Bugenhagen et al. |
| 2017/0034763 | A1 | 2/2017 | Reddy et al. |
| 2017/0111221 | A1 | 4/2017 | Chouhan |
| 2017/0308395 | A1 | 10/2017 | Cook et al. |
| 2017/0311244 | A1* | 10/2017 | Kodaypak ............. H04W 48/18 |
| 2018/0219959 | A1 | 8/2018 | Bugenhagen et al. |

(56) References Cited

U.S. PATENT DOCUMENTS

2018/0248973 A1    8/2018  Cook et al.
2019/0037398 A1*  1/2019  Eriksson ................ H04W 8/12

FOREIGN PATENT DOCUMENTS

| WO | WO-2015077460 | 5/2015 |
| WO | WO-2016025497 | 2/2016 |
| WO | WO-2016025501 | 2/2016 |
| WO | WO-2017146768 | 8/2017 |

OTHER PUBLICATIONS

Henrik Basilier et al. *Ericsson Review*. "Virtualizing network services—the telecom cloud," Mar. 28, 2014, Retrieved from the Internet: <http://www.ericsson.com/res/thecompany/docs/publications/ericssor_review/2014/er-telecom-cloud.pdf> ISSN 0014-0171. pp. 1-9.

International Application No. PCT/US2014/024050; International Preliminary Report on Patentability dated Sep. 24, 2015; 6 pages.

International Application No. PCT/US2015/044682; International Search Report and Written Opinion dated Nov. 16, 2015; 13 pages.

International Application No. PCT/US2015/044690; International Search Report and Written Opinion dated Dec. 4, 2015; 12 pages.

International Search Report and Written Opinion prepared by the Korean Intellectual Property Office as International Searching Authority for PCT Intl Patent App. No. PCT/US2014/024050 dated Jun. 27, 2014; 9 pages.

International Search Report and Written Opinion prepared by the Korean Intellectual Property Office as International Searching Authority for PCT Intl Patent App. No. PCT/US2014/066628 dated Mar. 10, 2015; 10 pages.

International Search Report and Written Opinion prepared by the Korean Intellectual Property Office as International Searching Authority for PCT Intl Patent App. No. PCT/US2016/044867 dated Nov. 23, 2016; 13 pages.

"RAD Launches vCPE Platform for Hosting VNFs", *LightReading* (Mar. 17, 2015). Web Site www.lightreading.com/nfv/nfv-elements/rad-launches-vcpe-platform-for-hosting-vnfs. Accessed Sep. 8, 2015, 1 pg.

Stuart Clayman et al. "The Dynamic Placement of Virtual Network Functions." In: 2014 IEEE Network Operations and Management Symposium (NOMS), May 5-9, 2014, pp. 1-9.

Gowan, Bo , "Ciena unveils a carrier-grade CPE for NFV.", Web Site www.ciena.com/connect/blog/Ciena-unveils-a-carrier-grade-CPE-for-NFV.html. Accessed Sep. 8, 2015 Jun. 22, 2015 , 4 pgs.

\* cited by examiner

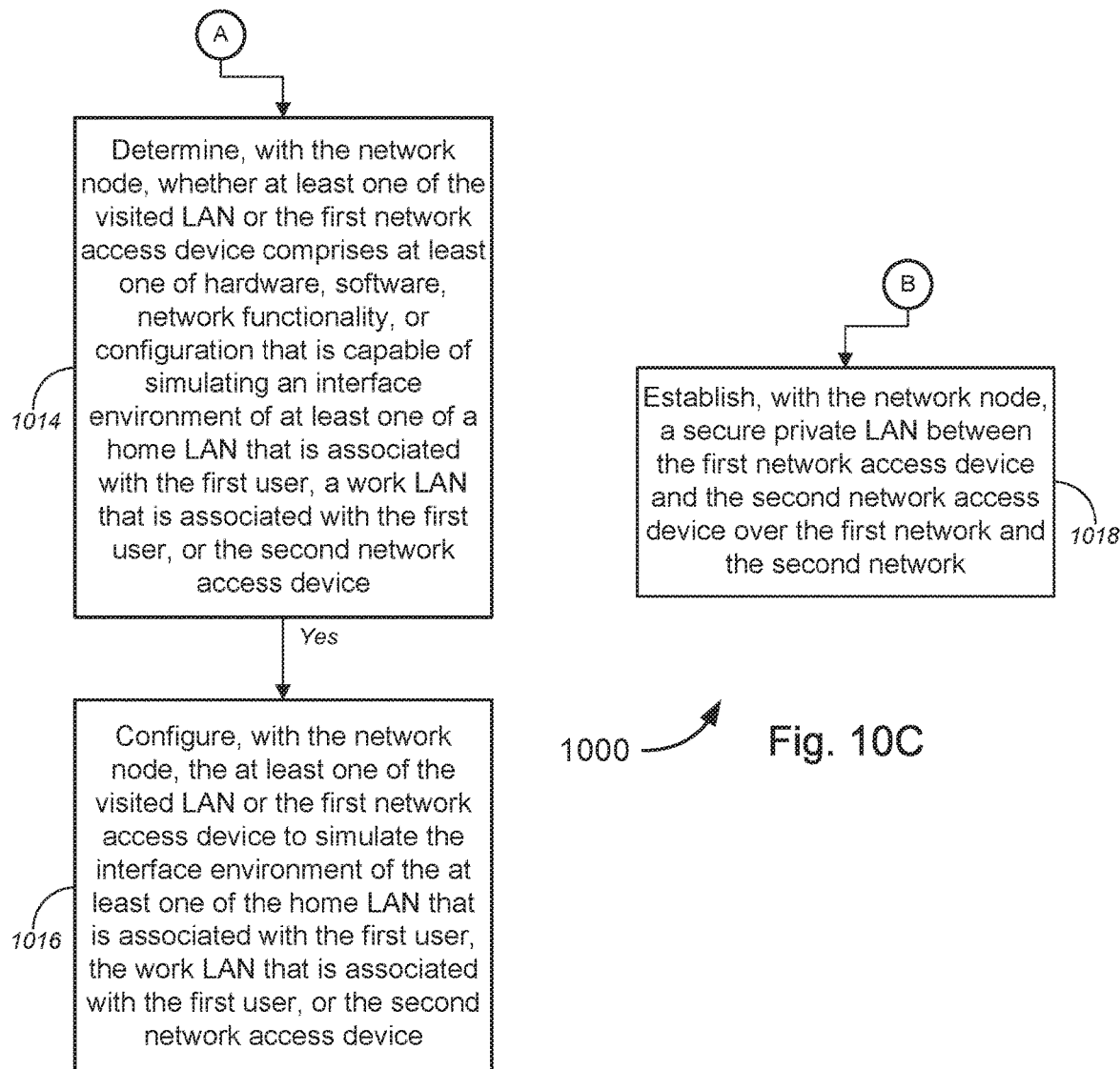

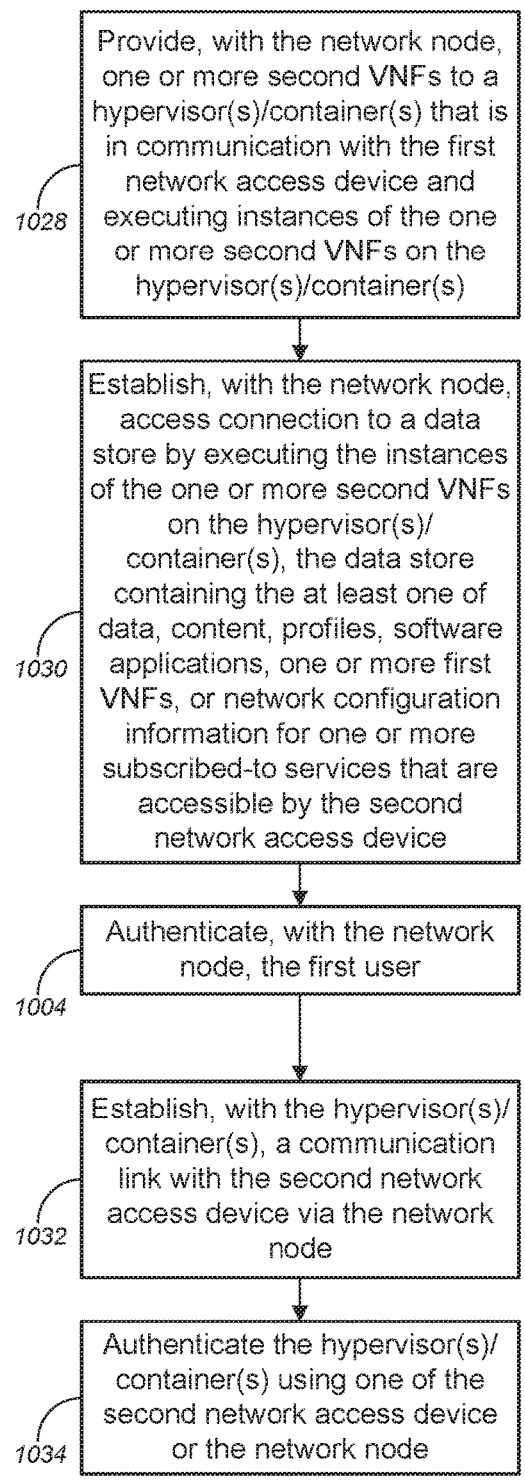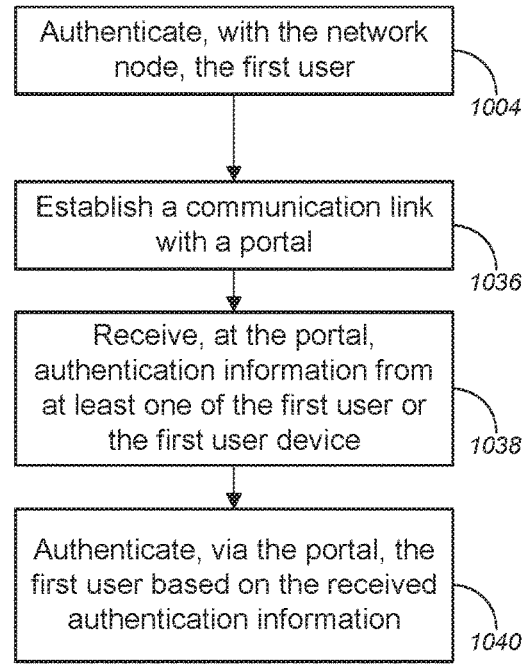
Fig. 10E
Fig. 10F

US 10,880,399 B2

METHOD AND SYSTEM FOR IMPLEMENTING NETWORK EXPERIENCE SHIFTING USING SHARED OBJECTS

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing network experience shifting, and, more particularly, to methods, systems, and apparatuses for implementing network experience shifting using shared objects.

BACKGROUND

Consumers today are very much accustomed to having personalized settings on their devices, including personalized smart phone settings, personalized tablet settings, personalized physical activity tracking settings, personalized computer desktop/laptop settings, etc. In some cases, consumers might also have personalized network settings for their home networks and/or for their work networks. When a customer travels to a different location that is not associated with the customer (e.g., hotel, overseas, friend's house, etc.), the customer might still have access to his or her personalized smart phone settings by bringing his or her smart phone, access to his or her personalized tablet settings by bringing his or her tablet, access to his or her physical activity tracking settings by bringing his or her physical activity tracking device, access to his or her personalized computer desktop/laptop settings by bringing his or her laptop computer, but would conventionally not have access to network settings or network-related settings, or the like, without implementing complicated steps (or at least involving significant user input) to establish virtual private networks or the like.

In conventional network systems, network telemetry might consist of only telemetry of an access network or LAN, or only end-to-end telemetry of multiple networks, but not both. Thus, conventional network systems can at most be optimized based on only one of access telemetry or end-to-end telemetry, but not both.

Moreover, there is no currently available way for subscribers to take their access environment and/or configuration that they have established and take it with them to another location, much less enabling automation of establishing access environment and/or configuration when accessing the network via a visited location using shared objects that provide information about network capabilities, services, and performance.

Hence, there is a need for more robust and scalable solutions for implementing network experience shifting, and, more particularly, to methods, systems, and apparatuses for implementing network experience shifting using shared objects.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 10A-10H are flow diagrams illustrating a method for implementing network experience shifting using shared objects, in accordance with various embodiments.

DETAILED DESCRIPTION OF CERTAIN EMBODIMENTS

Overview

Figure 1:
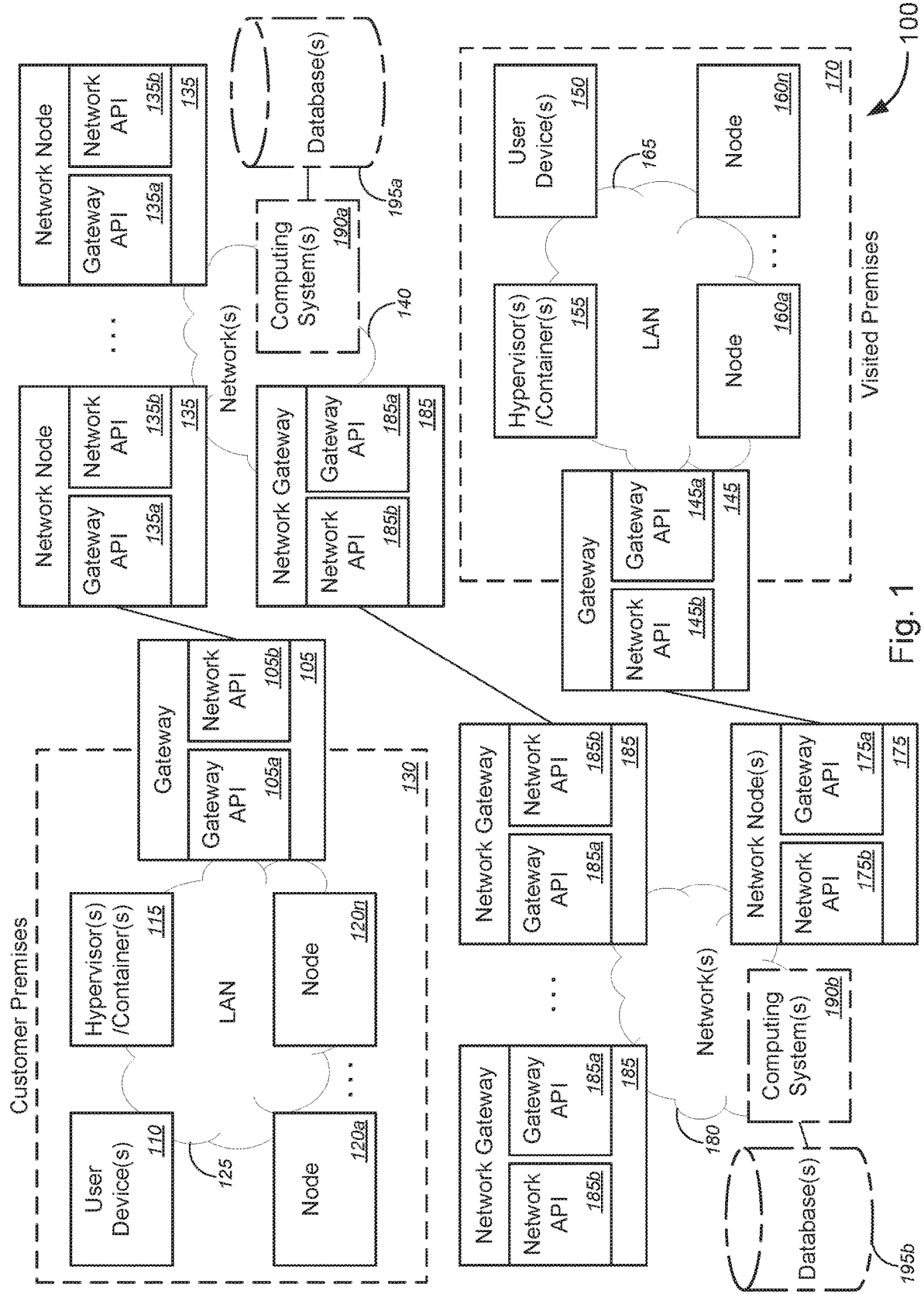
FIG. 1 is a schematic diagram illustrating a system for implementing network experience shifting using shared objects, in accordance with various embodiments.

Various embodiments provide tools and techniques for implementing network experience shifting, and, more particularly, to methods, systems, and apparatuses for implementing network experience shifting using shared objects.

In various embodiments, a network node in a first network might receive, via a first network access device in a second network, a request from a first user device to establish roaming network access, a first user of the first user device being associated with a second network access device in the first network and being unassociated with the first network access device, the second network access device being located in a different geographical location from the first network access device. The network node might authenticate the first user, receive customer network telemetry data (including information regarding visited LAN associated with the first network access device) via a gateway application programming interface ("API"), receive service provider network telemetry data (including information regarding networks) via a network API, determine whether the first user is associated with the second network access device, whether the first user is authorized to access services accessible by the second network access device. If so, the network node might determine whether at least one of the visited LAN or the first network access device comprises at least one of hardware, software, network functionality, or configuration that is capable of simulating an interface environment of at least one of a home LAN that is associated with the first user, a work LAN that is associated with the first user, or the second network access device. Based on a determination that at least one of the visited LAN or the first network access device comprises at least one of hardware, software, network functionality, or configuration that is capable of simulating an interface environment of at least one of the home LAN that is associated with the first user, the work LAN that is associated with the first user, or the second network access device, the network node might configure the visited LAN and/or the first network access device to simulate the interface environment of the user's home or work LAN or of the second network access device.

In some embodiments, the network node might include, without limitation, at least one of an API gateway, an access provider telemetry gateway, a residential gateway ("RG"), a business gateway ("BG"), a virtual gateway ("vG"; which can be disposed either in the LAN or in the WAN or other network, or the like), a network interface device ("NID"), at least one of the one or more user devices, a third party computing system, a network server, a distributed computing system, or a cloud computing system, and/or the like. According to some embodiments, the gateway device might include, but is not limited to, at least one of an API gateway, an access provider telemetry gateway, a RG, a BG, a vG, or a NID, and/or the like.

In response to a determination that the gateway device has become unreachable, the access provider telemetry gateway might send telemetry and state information regarding the gateway device to the network node.

In some cases, the network telemetry data might comprise information regarding one or more communications links along the at least portions of the one or more networks between the one or more user devices and the core network via the gateway device. In some instances, the information regarding one or more communications links along the at least portions of the one or more networks between the one or more user devices and the core network via the gateway device might comprise at least one of telemetry data regarding one or more communications links between the one or more user devices and the gateway device, telemetry data regarding one or more communications links between the gateway device and an edge router disposed between an access network and the core network, telemetry data regarding one or more communications links between the gateway device and a network element disposed in the access network, telemetry data regarding one or more communications links in one or more networks (e.g., WAN or other network, or the like), or end-to-end ("E2E") telemetry data regarding one or more communications links between the one or more user devices and the core network via the gateway device, and/or the like.

The various embodiments thus utilize dual network telemetry (i.e., access telemetry and network telemetry as described above) to optimize the various networks (e.g., LAN, WAN, etc.) in terms of use and functionality, and in some embodiments, enables the system (or network node of the system) to configure a visited LAN and/or a network access device associated with the visited LAN to simulate the interface environment of the user's home or work LAN or of the network access device associated with the user's home or work LAN, thereby enabling network experience shifting using shared objects.

These and other functionalities are described in detail below with respect to the various figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, network technology, network communications technology, network telemetry technology, network configuration technology, network access technology, virtualized network function technology, portable hypervisor technology, container technology, and/or the like. In other aspects, certain embodiments, can improve the functioning of network systems themselves (e.g., LAN, WAN, other networks, etc.) and/or user equipment or systems themselves (e.g., telecommunications equipment, network equipment, local hypervisors, portable hypervisors, containers, network nodes, etc.), for example, by receiving, at a network node in a first network and via a first network access device in a second network, a request from a first user device to establish roaming network access, a first user of the first user device being associated with a second network access device in the first network and being unassociated with the first network access device, the second network access device being located in a different geographical location from the first network access device; authenticating, with the network node, the first user; receiving, with the network node, customer network telemetry data via a gateway application programming interface ("API"), the customer network telemetry data comprising information regarding a visited local area network ("LAN") associated with the first network access device and information regarding the first network access device; receiving, with the network node, service provider network telemetry data via a network API, the service provider network telemetry data comprising at least one of information regarding the first network, information regarding at least one first network equipment in the first network, information regarding the second network, or information regarding at least one second network equipment in the second network; based on a determination that the first user is associated with the second network access device and that the first user is authorized to access at least one of data, content, profiles, software applications, one or more first VNFs, or one or more subscribed-to services that are accessible by the second network access device, determining, with the network node, whether at least one of the visited LAN or the first network access device comprises at least one of hardware, software, network functionality, or configuration that is capable of simulating an interface environment of at least one of a home LAN that is associated with the first user, a work LAN that is associated with the first user, or the second network access device; and based on a determination that at least one of the visited LAN or the first network access device comprises at least one of hardware, software, network functionality, or configuration that is capable of simulating an interface environment of at least one of the home LAN that is associated with the first user, the work LAN that is associated with the first user, or the second network access device, configuring, with the network node, the at least one of the visited LAN or the first network access device to simulate the interface environment of the at least one of the home LAN that is associated with the first user, the work LAN that is associated with the first user, or the second network access device; and/or the like.

In particular, to the extent any abstract concepts are present in the various embodiments, those concepts can be implemented as described herein by devices, software, systems, and methods that involve specific novel functionality (e.g., steps or operations), such as, in response to receiving the access telemetry data and the network telemetry data, the network node analyzes the dual telemetry data (i.e., the access telemetry data and the network telemetry data). Based on a determination that the first user is associated with the second network access device and that the first user is authorized to access at least one of data, content, profiles, software applications, one or more first VNFs, or one or more subscribed-to services that are accessible by the second network access device and based on a determination that at least one of the visited LAN or the first network access device comprises at least one of hardware, software, network functionality, or configuration that is capable of simulating an interface environment of at least one of the home LAN that is associated with the first user, the work LAN that is associated with the first user, or the second network access device—, the network node might determine how to optimize one or more networks (i.e., LAN, WAN, other networks, etc.) in terms of use and functionality, and in some cases might configure the at least one of the visited LAN or the first network access device to simulate the interface environment of the at least one of the home LAN that is associated with the first user, the work LAN that is associated with the first user, or the second network access device; and/or the like, to name some examples, that extend beyond mere conventional computer processing operations. These functionalities can produce tangible results outside of the implementing computer system, including, merely by way of example, ability for the user to access his or her home/work network settings and profiles and/or to have a user interface or network environment that simulates that of the user's home network or home network access device, even when travelling to a different location (e.g., overseas, a different part of the country, a friend's house, etc.) without having to do anything, ability for the user to access his or her data, content, profiles, software applications, VNFs, and/or subscribed-to services—which might be located on the user's home/work LAN, in the network, in cloud storage, and/or the like—even when travelling to a different location without having to do anything, and/or the like, based on the shared objects as obtained via dual network telemetry API framework, or the like, which may be observed or measured by customers and/or service providers.

In an aspect, a method might comprise receiving, at a network node in a first network and via a first network access device in a second network, a request from a first user device to establish roaming network access, a first user of the first user device being associated with a second network access device in the first network and being unassociated with the first network access device, the second network access device being located in a different geographical location from the first network access device; and authenticating, with the network node, the first user. The method might further comprise receiving, with the network node, customer network telemetry data via a gateway application programming interface ("API"), the customer network telemetry data comprising information regarding a visited local area network ("LAN") associated with the first network access device and information regarding the first network access device; and receiving, with the network node, service provider network telemetry data via a network API, the service provider network telemetry data comprising at least one of information regarding the first network, information regarding at least one first network equipment in the first network, information regarding the second network, or information regarding at least one second network equipment in the second network.

The method might also comprise determining, with the network node, whether the first user is associated with the second network access device; determining, with the network node, whether the first user is authorized to access at least one of data, content, profiles, software applications, one or more first virtual network functions ("VNFs"), or one or more subscribed-to services that are accessible by the second network access device; and based on a determination that the first user is associated with the second network access device and that the first user is authorized to access at least one of data, content, profiles, software applications, one or more first VNFs, or one or more subscribed-to services that are accessible by the second network access device, determining, with the network node, whether at least one of the visited LAN or the first network access device comprises at least one of hardware, software, network functionality, or configuration that is capable of simulating an interface environment of at least one of a home LAN that is associated with the first user, a work LAN that is associated with the first user, or the second network access device. The method might further comprise, based on a determination that at least one of the visited LAN or the first network access device comprises at least one of hardware, software, network functionality, or configuration that is capable of simulating an interface environment of at least one of the home LAN that is associated with the first user, the work LAN that is associated with the first user, or the second network access device, configuring, with the network node, the at least one of the visited LAN or the first network access device to simulate the interface environment of the at least one of the home LAN that is associated with the first user, the work LAN that is associated with the first user, or the second network access device.

According to some embodiments, the network node might include, without limitation, one of a gateway device, a network switch, a network functions virtualization ("NFV") entity, or a software defined network ("SDN") controller, wherein the NFV entity comprises at least one of a NFV orchestrator, a network functions virtualization infrastructure ("NFVI") system, a NFV management and orchestration ("MANO") system, a VNF manager ("VNFM"), a NFV resource manager, a virtualized infrastructure manager ("VIM"), a virtual machine ("VM"), a macro orchestrator, or a domain orchestrator, and/or the like. In some embodiments, the first user device might include, but is not limited to, one of a tablet computer, a smart phone, a mobile phone, a portable gaming device, a laptop computer, a portable hypervisor, a modem, a radio device, or a token chip device, and/or the like.

In some cases, the first network access device and the second network access device might each include, without limitation, at least one of a customer premises equipment ("CPE"), a router, a switch, a network element, a demarcation device, a WiFi gateway device, a hypervisor platform, one or more virtual machine-based host machines, or a network node capable of hosting a hypervisor, and/or the like. In some instances, the CPE might include, but is not limited to, at least one of an optical network terminal ("ONT"), a network interface device ("NID"), an enhanced NID ("eNID"), a residential gateway ("RG") device, a business gateway ("BG") device, a virtual gateway ("vG") device, an integrated cable modem/gateway, an integrated radio/gateway, or an integrated transceiver gateway device, and/or the like. In some embodiments, the first network and the second network might be associated with the same network service provider. Alternatively, the first network and the second network might be associated with different network service providers.

In some embodiments, the method might further comprise providing, with the network node, one or more second VNFs to at least one of one or more hypervisors or the one or more containers that is in communication with the first network access device and executing instances of the one or more second VNFs on the at least one of one or more hypervisors or the one or more containers, wherein each of the at least one of one or more hypervisors or the one or more containers comprises a compute resource, a memory, and a storage; and establishing, with the network node, access connection to a data store by executing the instances of the one or more second VNFs on the at least one of one or more hypervisors or the one or more containers, the data store containing the at least one of data, content, profiles, software applications, one or more first VNFs, or network configuration information for one or more subscribed-to services that are accessible by the second network access device.

According to some embodiments, the at least one of one or more hypervisors or the one or more containers might be one of integrated with the first network access device, communicatively coupled to a host port of the first network access device, communicatively coupled to a universal serial bus ("USB") port of the first network access device, communicatively coupled to a local area network ("LAN") port of the first network access device, or communicatively coupled to a communication port of the first network access device that is different from any of the host port, the USB port, and the LAN port, and/or the like. In some embodiments, the at least one of one or more hypervisors or the one or more containers and the first user device might be associated with the first user and unassociated with the first network access device or any network nodes in the second network. In some cases, the at least one of one or more hypervisors or the one or more containers and the first user device might be the same device, and might be embodied as a roaming hypervisor. The one or more second VNFs that are provided to the roaming hypervisor might be VNFs that are already subscribed to by the first user.

In some embodiments, authenticating, with the network node, the first user might comprise establishing, with the at least one of one or more hypervisors or the one or more containers, a communication link with the second network access device via the network node; and authenticating the at least one of one or more hypervisors or the one or more containers using one of the second network access device or the network node.

Alternatively, or additionally, authenticating, with the network node, the first user might comprise establishing a communication link with a portal; receiving, at the portal, authentication information from at least one of the first user or the first user device; and authenticating, via the portal, the first user based on the received authentication information.

According to some embodiments, the request from the first user device might be automatically sent from the first user device via the first network access device, without user input from the first user, wherein the first user device and the first network access device might communicate with each other using at least one of machine-to-machine ("M2M") communication, M2M protocols, Internet of Things ("IoT") communication, IoT protocols, or IoT proxy functions, and/or the like.

In some embodiments, the method might further comprise, based on a determination that the first user is associated with the second network access device and that the first user is authorized to access at least one of data, content, profiles, software applications, one or more first VNFs, or one or more subscribed-to services that are accessible by the second network access device, establishing, with the network node, a secure private LAN between the first network access device and the second network access device over the first network and the second network.

According to some embodiments, the method might further comprise, in response to determining that the first user is authorized to access one or more subscribed-to services that are accessible by the second network access device: determining, with the network node, whether implementation of the one or more subscribed-to services exceeds physical limitations of the first network access device; based on a determination that implementation of the one or more subscribed-to services is within capabilities of the first network access device, reconfiguring, with the network node, at least one of network configurations or network settings to provide the first user with the one or more subscribed-to services via the first network access device; and based on a determination that implementation of the one or more subscribed-to services exceeds physical limitations of the first network access device, reconfiguring, with the network node, at least one of network configurations or network settings to provide the first user with the one or more subscribed-to services via the first network access device, up to the limits of the first network access device. In some cases, the method might further comprise, based on a determination that the first user device is no longer in communication with the first network access device, reverting, with the network node, the at least one of network configurations or network settings to previous configurations or settings.

In some cases, receiving the customer network telemetry data via the gateway API might comprise receiving, with the network node, customer network telemetry data via the gateway API by pulling the customer network telemetry data from the one or more first nodes of the LAN via the gateway API. In some embodiments, receiving the service provider network telemetry data via the network API might comprise receiving, with the network node, service provider network telemetry data via the network API by pulling the service provider network telemetry data from the one or more second nodes of each of the one or more service provider networks via the network API.

In some instances, the customer network telemetry data might be published to a first repository by at least one first node of the one or more first nodes in the LAN, and receiving the customer network telemetry data via the gateway API might comprise receiving, with the network node, customer network telemetry data via the gateway API by subscribing to the first repository. According to some embodiments, the service provider network telemetry data might be published to a second repository by at least one second node of the one or more second nodes in each of the one or more service provider networks, and receiving the service provider network telemetry data via the network API might comprise receiving, with the network node, service provider network telemetry data via the network API by subscribing to the second repository.

In some embodiments, the customer network telemetry data and the service provider network telemetry data might each comprise at least one of service operations, administration, and management ("Service OAM") data, service activation testing ("SAT") data, Iperf network performance measurement and tuning data, real-time statistics data, transmitted frame information, received frame information, transmitted packet information, received packet information, information regarding a processing unit of the gateway device, information regarding processing units of each of the one or more first nodes, information regarding processing units of each of the one or more second nodes, alarm indication signal ("AIS") data, data regarding whether one or more nodes are powered, data regarding whether one or more nodes are connected, device identification information of each of one or more nodes, device capability information of each of one or more nodes, resource consumption information for each of one or more network resources, or resource consumption information by each of one or more devices, and/or the like.

In another aspect, a computing system in a first network might comprise at least one processor and a non-transitory computer readable medium communicatively coupled to the at least one processor. The non-transitory computer readable medium might have stored thereon computer software comprising a set of instructions that, when executed by the at least one processor, causes the computing system to: receive, via a first network access device in a second network, a request from a first user device to establish roaming network access, a first user of the first user device being associated with a second network access device in the first network and being unassociated with the first network access device, the second network access device being located in a different geographical location from the first network access device; authenticate the first user; determine whether the first user is associated with the second network access device; determine whether the first user is authorized to access at least one of data, content, profiles, software applications, one or more first virtual network functions ("VNFs"), or one or more subscribed-to services that are accessible by the second network access device; receive customer network telemetry data via a gateway application programming interface ("API"), the customer network telemetry data comprising information regarding a visited local area network ("LAN") associated with the first network access device and information regarding the first network access device; receive service provider network telemetry data via a network API, the service provider network telemetry data comprising at least one of information regarding the first network, information regarding at least one first network equipment in the first network, information regarding the second network, or information regarding at least one second network equipment in the second network; based on a determination that the first user is associated with the second network access device and that the first user is authorized to access at least one of data, content, profiles, software applications, one or more first VNFs, or one or more subscribed-to services that are accessible by the second network access device, determine whether at least one of the visited LAN or the first network access device comprises at least one of hardware, software, network functionality, or configuration that is capable of simulating an interface environment of at least one of a home LAN that is associated with the first user, a work LAN that is associated with the first user, or the second network access device; and based on a determination that at least one of the visited LAN or the first network access device comprises at least one of hardware, software, network functionality, or configuration that is capable of simulating an interface environment of at least one of the home LAN that is associated with the first user, the work LAN that is associated with the first user, or the second network access device, configure the at least one of the visited LAN or the first network access device to simulate the interface environment of the at least one of the home LAN that is associated with the first user, the work LAN that is associated with the first user, or the second network access device.

In yet another aspect, a system might comprise one or more first nodes in a visited local area network ("LAN"), one or more second nodes in each of one or more service provider networks, and a network node. Each first node might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the first node to: obtain customer network telemetry data comprising information regarding the visited LAN and information regarding a gateway that connects the one or more user devices to one or more service provider networks; and send the customer network telemetry data to a network node in a first network via a gateway application programming interface ("API"). Each second node might comprise at least one second processor and a second non-transitory computer readable medium communicatively coupled to the at least one second processor. The second non-transitory computer readable medium might have stored thereon computer software comprising a second set of instructions that, when executed by the at least one second processor, causes the second node to: obtain service provider network telemetry data comprising information regarding a corresponding one of the one or more service provider networks and information regarding at least one network equipment in the corresponding one of one or more service provider networks; and send the service provider network telemetry data to the network node via a network API. The network node might comprise at least one third processor and a third non-transitory computer readable medium communicatively coupled to the at least one third processor. The third non-transitory computer readable medium might have stored thereon computer software comprising a third set of instructions that, when executed by the at least one third processor, causes the network node to: receive, via a first network access device in a second network, a request from a first user device to establish roaming network access, a first user of the first user device being associated with a second network access device in the first network and being unassociated with the first network access device, the second network access device being located in a different geographical location from the first network access device; authenticate the first user; determine whether the first user is associated with the second network access device; determine whether the first user is authorized to access at least one of data, content, profiles, software applications, one or more first virtual network functions ("VNFs"), or one or more subscribed-to services that are accessible by the second network access device; receive customer network telemetry data via the gateway API; receive service provider network telemetry data via the network API; based on a determination that the first user is associated with the second network access device and that the first user is authorized to access at least one of data, content, profiles, software applications, one or more first VNFs, or one or more subscribed-to services that are accessible by the second network access device, determine whether at least one of the visited LAN or the first network access device comprises at least one of hardware, software, network functionality, or configuration that is capable of simulating an interface environment of at least one of a home LAN that is associated with the first user, a work LAN that is associated with the first user, or the second network access device; and based on a determination that at least one of the visited LAN or the first network access device comprises at least one of hardware, software, network functionality, or configuration that is capable of simulating an interface environment of at least one of the home LAN that is associated with the first user, the work LAN that is associated with the first user, or the second network access device, configure the at least one of the visited LAN or the first network access device to simulate the interface environment of the at least one of the home LAN that is associated with the first user, the work LAN that is associated with the first user, or the second network access device.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-12 illustrate some of the features of the method, system, and apparatus for implementing network experience shifting, and, more particularly, to methods, systems, and apparatuses for implementing network experience shifting using shared objects, as referred to above. The methods, systems, and apparatuses illustrated by FIGS. 1-12 refer to examples of different embodiments that include various components and steps, which can be considered alternatives or which can be used in conjunction with one another in the various embodiments. The description of the illustrated methods, systems, and apparatuses shown in FIGS. 1-12 is provided for purposes of illustration and should not be considered to limit the scope of the different embodiments.

The various embodiments may utilize aspects of the network experience shifting methods and systems as described in detail in the '482 Application and related applications, and may also utilize aspects of the dual network telemetry API framework methods and systems as described in detail in the '021 Application and related applications, all of which have already been incorporated herein by reference in their entirety for all purposes.

With reference to the figures, FIG. 1 is a schematic diagram illustrating a system 100 for implementing network experience shifting using shared objects, in accordance with various embodiments.

In the non-limiting example of FIG. 1, system 100 might comprise a first gateway device 105, one or more first user devices 110, one or more first hypervisors/containers 115, one or more first nodes 120a-120n (collectively, "first nodes 120" or "nodes 120," or the like), and/or the like that are in communication with and/or are part of a first local area network ("LAN") 125 that is disposed within customer premises 130. In some cases, LAN 125 might further comprise a wireless LAN ("WLAN"). System 100 might further comprise one or more network nodes 135 that may be disposed in one or more networks 140.

System 100 might further comprise a second gateway device 145, one or more second user devices 150, one or more second hypervisors/containers 155, one or more second nodes 160a-160n (collectively, "second nodes 160" or "nodes 160," or the like), and/or the like that are in communication with and/or are part of a second local area network ("LAN") 165 that is disposed within visited premises 170. In some cases, LAN 165 might further comprise a WLAN. System 100 might further comprise one or more network nodes 175 that may be disposed in one or more networks 180. System 100 might also comprise one or more network gateways 185 that may be disposed in one of network(s) 140 (shown in FIG. 1), network(s) 180 (shown in FIG. 1), or some other intermediary network(s) (not shown), the one or more network gateways 185 connecting the one of network(s) 140, network(s) 180, or some other intermediary network(s), and/or the like to at least one other of network(s) 140, network(s) 180, or some other intermediary network(s), and/or the like. System 100 might optionally comprise computing systems 190a and 190b (collectively, "computing systems 190" or the like) and corresponding databases 195*a* and 195*b* (collectively, "databases 195" or the like) that may be disposed in network(s) 140 and 180, respectively, or the like.

Herein, LAN 125 might comprise various customer devices (including, but not limited to, user device(s) 110, hypervisor(s)/container(s) 115, nodes 120*a*-120*n*, etc.) networked together via switching/routing device (i.e., gateway 105, or the like). Alternatively, or additionally, LAN 125—to which a user might directly connect via customer devices, or the like—might further comprise various access devices (including, but not limited to, a xDSL modem, an optical network terminal ("ONT"), a network interface device ("NID"), etc.) that may contain no more than one customer-side port, and hence has no internal switching and/or routing functionality. Similarly, LAN 165 might comprise various customer devices (including, but not limited to, user device(s) 150, hypervisor(s)/container(s) 155, nodes 160*a*-160*n*, etc.) networked together via switching/routing device (i.e., gateway 145, or the like). Alternatively, or additionally, LAN 165—to which a user might directly connect via customer devices, or the like—might further comprise various access devices (including, but not limited to, a xDSL modem, an optical network terminal ("ONT"), a network interface device ("NID"), etc.) that may contain no more than one customer-side port, and hence has no internal switching and/or routing functionality. For example, a service provider might deploy a service over Gigabit passive optical network ("GPON") where the ONT is mounted in a wall of the customer premises 130 or visited premises 170. In some cases, the ONT might include a single RJ-45 jack embedded in a wall plate for the customer to plug into. The customer may plug his or her device directly into the single RJ-45 jack without using an Ethernet switch between the wall plate and his or her user device(s) (e.g., laptop, tablet, smart phone, and/or the like). For purposes of description herein, such configuration of the customer plugging his or her device directly into the single RJ-45 jack might be considered part of the LAN 125 or LAN 165.

In some embodiments, the first gateway device 105 might comprise a gateway application programming interface ("API") 105*a* and a network API 105*b*, while the second gateway device 145 might comprise a gateway API 145*a* and a network API 145*b*, and each of the network nodes 135 might comprise a gateway API 135*a* and a network API 135*b*, while each of the network nodes 175 might comprise a gateway API 175*a* and a network API 175*b*, and each of the network gateways 185 might comprise a gateway API 185*a* and a network API 185*b*. According to some embodiments, the network API 105*b* of gateway 105 of customer premises LAN 125 might communicatively couple to gateway API 135*a* of network node 135, while the network API 185*b* of network gateway 185 in network(s) 140 might communicatively couple to the network API 185*b* of network gateway 185 in network(s) 180, and the gateway API 175*a* of network node(s) 175 might communicatively couple to the network API 145*b* of gateway 145 of visited premises LAN 165.

In some embodiments, the first gateway device 105 and the second gateway device 145 might each include, without limitation, at least one of an API gateway, a network gateway, an access provider telemetry gateway, a residential gateway ("RG"), a business gateway ("BG"), a virtual gateway ("vG"), or a network interface device ("NID"), and/or the like. The nodes 120, the network nodes 135, the nodes 160, the network nodes 175, the network gateways 185, and the computing systems 190 might each include, but is not limited to, at least one of an API gateway, a network gateway, an access provider telemetry gateway, a RG, a BG, a vG (which might be disposed in one of the LAN 125, the network(s) 140, the LAN 165, and/or the network(s) 180, or the like), a NID, a third party computing system, a customer computing system, an internal network-to-network interface ("INNI") system, an external network-to-network interface ("ENNI") system, a network server, a distributed computing system, or a cloud computing system, and/or the like.

In operation, a network node or computing system in a first network (which might be embodied by gateway 105 or first node(s) 120 in LAN 125 or network node(s) 135 or computing system(s) 190*a* in network(s) 140, or the like) might receive, via a first network access device (e.g., gateway device 145 or the like) in a second network (e.g., LAN 165 or the like), a request from a user device (e.g., user device(s) 150 or hypervisor(s)/container(s) 155, or the like) to establish roaming network access at the visited premises 170, a first user of the user device being associated with a second network access device (e.g., gateway 105) in a network (e.g., LAN 125, or the like) and being unassociated with the first network access device (i.e., gateway device 145 or the like), the second network access device being located in a different geographical location from the first network access device (i.e., customer premises 130 which is located at geographical location that is different from that of visited premises 170). The network node or computing system might authenticate the first user.

The network node or computing system might receive customer network telemetry data via gateway API 145*a*, 175*a*, and/or 185*a*, the customer network telemetry data comprising information regarding the visited LAN 165 associated with the first network access device (e.g., gateway device 145) and information regarding the first network access device (i.e., receiving customer network telemetry data of LAN 165 via gateway API 145*a* or the like); might receive service provider network telemetry data via a network API 145*b*, 175*b*, 185*b*, 135*b*, and/or 105*b*, the service provider network telemetry data comprising at least one of information regarding the first network (i.e., network(s) 125), information regarding at least one first network equipment in the first network (i.e., network(s) 125), information regarding the second network (i.e., network(s) 165), or information regarding at least one second network equipment in the second network (i.e., network(s) 165), and/or the like. Alternatively, or additionally, the network node or computing system might receive customer network telemetry data via gateway API 105*a*, 135*a*, and/or 185*a*, the customer network telemetry data comprising information regarding the customer LAN 130 associated with the second network access device (e.g., gateway device 105) and information regarding the second network access device (i.e., receiving customer network telemetry data of LAN 125 via gateway API 105*a* or the like).

The network node or computing system might determine whether the first user is associated with the second network access device (i.e., gateway device 105); and might determine whether the first user is authorized to access at least one of data, content, profiles, software applications, one or more first virtual network functions ("VNFs"), or one or more subscribed-to services that are accessible by the second network access device (i.e., gateway device 105).

Based on a determination that the first user is associated with the second network access device (i.e., gateway device 105) and that the first user is authorized to access at least one of data, content, profiles, software applications, one or more first VNFs, or one or more subscribed-to services that are accessible by the second network access device (i.e., gateway device 105), the network node or computing system might determine whether at least one of the visited LAN 165 or the first network access device 145 comprises at least one of hardware, software, network functionality, or configuration that is capable of simulating an interface environment of at least one of a customer LAN 125 (e.g., a home LAN 125 that is associated with the first user, a work LAN 125 that is associated with the first user, and/or the like) or the second network access device (i.e., gateway 105). Based on a determination that at least one of the visited LAN 165 or the first network access device 145 comprises at least one of hardware, software, network functionality, or configuration that is capable of simulating an interface environment of at least one of a customer LAN 125 (e.g., a home LAN 125 that is associated with the first user, a work LAN 125 that is associated with the first user, and/or the like) or the second network access device (i.e., gateway 105), the network node or computing system might configure the at least one of the visited LAN 165 or the first network access device (i.e., gateway 145) to simulate the interface environment of the at least one of a customer LAN 125 (e.g., a home LAN 125 that is associated with the first user, a work LAN 125 that is associated with the first user, and/or the like) or the second network access device (i.e., gateway 105). The customer network telemetry data of the LAN 130 and/or the second network access device provides a basis for which the system may configure the at least one of the visited LAN 165 or the first network access device (i.e., gateway 145) to simulate the interface environment of the at least one of a customer LAN 125 (e.g., a home LAN 125 that is associated with the first user, a work LAN 125 that is associated with the first user, and/or the like) or the second network access device (i.e., gateway 105).

According to some embodiments, the network node or computing system might include, without limitation, one of a gateway device, a network switch, a network functions virtualization ("NFV") entity, or a software defined network ("SDN") controller, wherein the NFV entity comprises at least one of a NFV orchestrator, a network functions virtualization infrastructure ("NFVI") system, a NFV management and orchestration ("MANO") system, a VNF manager ("VNFM"), a NFV resource manager, a virtualized infrastructure manager ("VIM"), a virtual machine ("VM"), a macro orchestrator, or a domain orchestrator, and/or the like. In some embodiments, the first network (i.e., LAN 125) and the second network (i.e., LAN 165) might be associated with the same network service provider. In some cases, the first network and the second network might be the same network. Alternatively, the first network (i.e., LAN 125) and the second network (i.e., LAN 165) might be associated with different network service providers.

In some embodiments, the network node or computing system might provide one or more second VNFs to at least one of one or more hypervisors or the one or more containers that is in communication with the first network access device (i.e., hypervisor(s)/container(s) 155 in communication with the gateway 145, or the like) and executing instances of the one or more second VNFs on the at least one of one or more hypervisors or the one or more containers. In some cases, each of the at least one of one or more hypervisors or the one or more containers might comprise a compute resource, a memory, and a storage, and/or the like. The network node or computing system might establish access connection to a data store by executing the instances of the one or more second VNFs on the at least one of one or more hypervisors or the one or more containers, the data store containing the at least one of data, content, profiles, software applications, one or more first VNFs, or network configuration information for one or more subscribed-to services that are accessible by the second network access device. Merely by way of example, the data store might include, but is not limited to, at least one of one or more databases local to the home LAN (e.g., LAN 125) that is associated with the first user, one or more databases local to the work LAN (e.g., LAN 165) that is associated with the first user, one or more databases disposed within the network node (e.g., network node(s) 135, network node(s) 175, network gateway(s) 185, or the like), one or more databases external yet communicatively coupled to the network node (e.g., network node(s) 135, network node(s) 175, network gateway(s) 185, or the like), one or more databases communicatively coupled to a profile server, a data library, a content library, a profile library, a VNF library, or a network configuration library, and/or the like.

According to some embodiments, the at least one of one or more hypervisors or the one or more containers might be one of integrated with the first network access device, communicatively coupled to a host port of the first network access device, communicatively coupled to a universal serial bus ("USB") port of the first network access device, communicatively coupled to a local area network ("LAN") port of the first network access device, or communicatively coupled to a communication port of the first network access device that is different from any of the host port, the USB port, and the LAN port, and/or the like. In some cases, the at least one of one or more hypervisors or the one or more containers and the first user device might be associated with the first user and unassociated with the first network access device or any network nodes in the second network. In some instances, the at least one of one or more hypervisors or the one or more containers and the first user device might be the same device, and might be embodied as a roaming hypervisor, where the one or more second VNFs that are provided to the roaming hypervisor are VNFs that are already subscribed to by the first user. In some cases, authenticating, with the network node, the first user might comprise: establishing, with the at least one of one or more hypervisors or the one or more containers, a communication link with the second network access device via the network node; and authenticating the at least one of one or more hypervisors or the one or more containers using one of the second network access device or the network node.

Alternatively, authenticating, with the network node, the first user might comprise: establishing a communication link with a portal; receiving, at the portal, authentication information from at least one of the first user or the first user device; and authenticating, via the portal, the first user based on the received authentication information.

In some embodiments, the request from the first user device might be automatically sent from the first user device via the first network access device, without user input from the first user. The first user device and the first network access device might communicate with each other using at least one of machine-to-machine ("M2M") communication, M2M protocols, Internet of Things ("IoT") communication, IoT protocols, or IoT proxy functions, and/or the like. In some cases, receiving the request from the first user device to establish roaming network access might comprise receiving, at the network node, the request from the first user device to establish roaming network access via the first network access device and via a docking station that is communicatively coupled to the first network access device.

According to some embodiments, based on a determination that the first user is associated with the second network access device and that the first user is authorized to access at least one of data, content, profiles, software applications, one or more first VNFs, or one or more subscribed-to services that are accessible by the second network access device, the network node or computing system might establish a secure private LAN between the first network access device and the second network access device over the first network and the second network.

In some embodiments, in response to determining that the first user is authorized to access one or more subscribed-to services that are accessible by the second network access device, the network node or computing system might determine whether implementation of the one or more subscribed-to services exceeds physical limitations of the first network access device; based on a determination that implementation of the one or more subscribed-to services is within capabilities of the first network access device, reconfigure at least one of network configurations or network settings to provide the first user with the one or more subscribed-to services via the first network access device; and based on a determination that implementation of the one or more subscribed-to services exceeds physical limitations of the first network access device, reconfigure at least one of network configurations or network settings to provide the first user with the one or more subscribed-to services via the first network access device, up to the limits of the first network access device. In some cases, based on a determination that the first user device is no longer in communication with the first network access device, the network node or computing system might revert the at least one of network configurations or network settings to previous configurations or settings. For example, a person, who has subscribed to a 10 Mbps service, might roam to a location that might only be configured to deliver a 5 Mbps service even though the network is capable of delivering a 10 Mbps service to that location. The system, based on the roaming subscriber's profile, might reconfigure the network access device at the roamed-to location and might reconfigure the service to provide 10 Mbps to the roaming user, and, in some cases, might also handle any billing that may be associated with the reconfiguration of the network access device and the service. When the roaming user leaves the visited or roamed-to location, the original 5 Mbps configuration may be automatically restored.

In some instances, receiving the customer network telemetry data via the gateway API might comprise receiving, with the network node or computing system, customer network telemetry data via the gateway API by pulling the customer network telemetry data from the one or more first nodes of the LAN via the gateway API, and receiving the service provider network telemetry data via the network API comprises receiving, with the network node or computing system, service provider network telemetry data via the network API by pulling the service provider network telemetry data from the one or more second nodes of each of the one or more service provider networks via the network API. Alternatively, in some cases, the customer network telemetry data might be published to a first repository by at least one first node of the one or more first nodes in the LAN, while the service provider network telemetry data might be published to a second repository by at least one second node of the one or more second nodes in each of the one or more service provider networks, and receiving the customer network telemetry data via the gateway API might comprise receiving, with the network node or computing system, customer network telemetry data via the gateway API by subscribing to the first repository, and receiving the service provider network telemetry data via the network API might comprise receiving, with the network node or computing system, service provider network telemetry data via the network API by subscribing to the second repository.

Merely by way of example, in some embodiments, the customer network telemetry data and the service provider network telemetry data might each include, without limitation, at least one of service operations, administration, and management ("Service OAM") data, service activation testing ("SAT") data, Iperf network performance measurement and tuning data, real-time statistics data, transmitted frame information, received frame information, transmitted packet information, received packet information, information regarding a processing unit of the gateway device, information regarding processing units of each of the one or more first nodes, information regarding processing units of each of the one or more second nodes, alarm indication signal ("AIS") data, data regarding whether one or more nodes are powered, data regarding whether one or more nodes are connected, device identification information of each of one or more nodes, device capability information of each of one or more nodes, power status information, information for triggering device restarts, resource consumption information for each of one or more network resources, or resource consumption information by each of one or more devices, and/or the like.

In the various embodiments, a user can configure his or her access environment how he or she likes it, and would be able to take it with them so that when he or she plugs into a network at a visited location, he or she is able to automatically obtain access to the network and to his or her services, and is able to have such access configured in the same or similar manner as such access is configured on the user's home network. In some embodiments, a virtual private network ("VPN") service might be provided so that even when the user is roaming, the user device might appear to still be on the user's original network. This might be an extra option the user might add to his or her profile, especially if he or she roams to countries where content has been restricted. The various embodiments also enable third parties innovation based at least in part on shared objects that are exposed to the third parties via one or more registries.

The various embodiments might be based on virtualization concepts, shared objects, and the mobile cellular network concept of a home location register ("HLR") and/or a visitor location register ("VLR"), or the like. A subscriber profile might be created by the user. When the user plugs in his or her device into a network connection, it "phones home" to a virtual network function manager ("VNFM") or the like. The VNFM or the like might obtain configuration information from the user's profile. The configuration information might be used to configure network equipment, services, and user equipment. The configuration and services may be embodied as virtualized network functions ("VNFs") or applications that the VNFM or the like instantiates on network function virtualization infrastructure ("NFVI") or the like. The NFVI or the like may be located in a home network, in a visited network, or on the user's device that the user has attached to the network. The VNFM or the like may also retrieve information about equipment, services, and/or performance from relevant sources via shared objects in order to know how to perform the configurations. The shared objects might be registered by the user, network providers, and/or service providers in a registry that contains the location of the shared object, requirements for using the shared objects (including billing), and any other appropriate information about the shared objects. The shared objects might now be accessible by the network, services, the user, and third parties to create new and innovative services.

According to some embodiments, in response to authenticating the user, the network node or computing system might perform one or more of the following: (i) push one or more VNFs to the hypervisor (which may be associated with the user (e.g., roaming hypervisor or the like) or may be unassociated with the user (e.g., roamed-to hypervisor or the like)) that is in communication with the second network access device and executing instances of the VNFs on the hypervisor (alternatively, the user or hypervisor might pull the one or more VNFs); (ii) establish a secure private LAN between the first network access device and the second network access device over the first and second networks; (iii) establish an application programming interface ("API") over at least one of the first network or the second network and providing the API with access to hypervisor that is communicatively coupled to the second network access device; (iv) establish one or more VXLANs over at least one of the first network or the second network, map the one or more VXLANs to hypervisor that is communicatively coupled to at least one of one or more LAN ports of the second network access device, and map the one or more VXLANs to the one or more LAN ports of the second network access device; (v) use network service headers ("NSH"), which is agnostic to transport media and is compatible with various transport protocols or (e.g., VXLAN protocols, multiprotocol label switching ("MPLS") protocols, etc.), to route VNFs to the roamed-to hypervisor or to the portable hypervisor; and/or the like.

In some embodiments, the request from the first user device might be automatically sent from the first user device via the first network access device, without user input from the first user. In such cases, the first user device and the first network access device might communicate with each other using at least one of machine-to-machine ("M2M") communication, M2M protocols, Internet of Things ("IoT") communication, IoT protocols, or IoT proxy functions, and/or the like. For example, the user might carry a token chip device when travelling to a different part of the country or to a different country on vacation or on a business trip. The token chip device might autonomously and automatically establish a wireless link to the local network access device (whether at a hotel, in a hotel room, at a business premises that may be associated with the user's employer or may be associated with a client or potential client, in a local coffee shop, in a local restaurant, etc.), and might automatically establish at least one of a secure private LAN, one or more VXLANS, and/or an API, to provide secure and private access to the user's data, content, profiles, apps, VNFs, and/or subscribed-to services to the user either via a local or roamed-to hypervisor that is communicatively coupled to the local network access device or via a roaming or portable hypervisor that the user also carries along. In alternative embodiments, the network node might push one or more VNFs to either the roamed-to hypervisor or the roaming hypervisor, and might execute instances of the VNFs on such hypervisor, to establish the at least one of a secure private LAN, one or more VXLANS, and/or an API, and/or to otherwise provide the user with secure and private access to the user's data, content, profiles, apps, VNFs, and/or subscribed-to services via such hypervisor.

In another alternative set of embodiments, a VNF that simulates the functions of a hypervisor (referred to herein as "hypervisor VNF," which is distinct from other VNFs that can be executed on a hypervisor) might be pushed to a user device or a local network node/gateway, thereby enabling service portability over a roamed-to network even if the roamed-to network does not support hypervisors. In some instances, the hypervisor or hypervisor VNF could be located deeper in the roamed-to network than the access node (i.e., closer to the core of the network than the network access device, or the like). In many cases, being closer to the user device is better because of performance attributes like lower latency, or the like. Initially, however, some implementations may start out being hosted on centralized servers, then subsequently pushed closer to the customers (i.e., to the access networks, gateways, etc.) as economics and demand dictate. In still another alternative set of embodiments, the user can carry copies of VNFs with him or her when roaming to run on the portable hypervisor on his or her user device, or the user can tunnel back to his or her home LAN to retrieve or pull copies of VNFs, or the user can access a library (which may be located in various network locations, in cloud storage, or the like) that has copies of the VNFs that he or she has subscribed to and pull such VNFs.

According to another set of embodiments, the user may be able to access at least one of data, content, profiles, apps, VNFs, and/or services via the roamed-to hypervisor, the roaming hypervisor, or a local network device running a pushed or pulled hypervisor VNF, or the like, using the techniques described herein. As to services being portable in this manner, an example might include a user plugging his or her user device into a port somewhere away from his or her home/work LAN (e.g., a port on a LAN in a neighbor's house, a port on a LAN hotel/motel/resort, a port on a LAN at a conference venue, a port on a public LAN, etc.). In the case of the neighbor's LAN being accessed, the neighbor may not subscribe to the same bandwidth or service level agreement. However, when the user device is attached or coupled to the neighbor's network, the user device can authenticate with an appropriate authentication server that will instruct the network to configure the access network to deliver the access service in accordance with the user's profile, subject to physical limitations of the access technology that the neighbor may have—e.g., the neighbor may be served by an xDSL technology that does not have the capability to device 1 Gbps service that the user may have subscribed to on a fiber network, etc. Depending on the user's SLA, there may be additional billing associated with reconfiguring the neighbor's network for the user. When the user removes his or her device from the neighbor's network, the network automatically reverts to the neighbor's access service profile. In a similar manner, public access networks (e.g., public LAN in a hotel/motel/resort, public LAN at a conference venue, other public LAN, etc.) can be reconfigured in like manner to provide the user with subscribed-to network service on the public-access network (subject to any physical limitations of the access technology of the public-access network). For such public LAN, reconfiguration of the network might also include establishing secure connections to turn the public LAN into a private LAN (e.g., VPN, etc.). When the user removes his or her device from the public access network, the network automatically reverts to its previous settings and configurations.

In the examples above, the user can be provided with access to his or her personalized network settings for his or her home network and/or for his or her work network—as well as access to his or her data, content, profiles, and/or software applications—, without doing anything (except, of course, carrying his or her user device and/or, in some cases, his or her portable hypervisor). Like in a cellular mobile network, a mobile or portable device (e.g., portable hypervisor, a device that has an integrated hypervisor, a device that has a detachable hypervisor, a device with a virtual hypervisor, or the like) a roam from one location to another without specific interaction with the user. If the mobile or portable device has previously visited a new network, the network may be able to partially or fully automate the authentication process, depending on the degree of secure identification information that is present.

In some aspects, through the use of managed or shared objects, the system (or at least one network node of the system) might determine what capabilities the user uses when connected to his or her own network (or network access device), and determining what capabilities the roamed-to location has (whether on the same network on a different network). Based on the information gained from the managed or shared objects, configuration and/or orchestration resources are able to reconstruct the environment (or interface environment) associated with the user at the roamed-to location and the system might also manage and/or coordinate any billing associated with such configuration and/or orchestration (and perhaps also associated with such management and coordination of the billing). If the full environment cannot be recreated at the roamed-to location (e.g., because the roamed-to location does not possess the requisite capabilities to do so), then the system might partially create the environment (or interface environment) associated with the user, in some cases, based at least in part on a ruleset that the user has established in his or her profile. In some embodiments, the recreated or simulated environment can include, without limitation, at least one of an instantiation of VNFs in the roamed-to network, the instantiation of VNFs in the customer premises equipment at the roamed-to location, or reconfiguration of subscribed-to network attributes (including, but not limited to, bandwidth, committed information rate ("CIR"), peak information rate ("PIR"), assured bandwidth, and/or the like). According to some embodiments, all reconfigurations may require authentication to be implemented.

According to some embodiments, if a profile of a first user is saved in an accessible storage device, a second user could obtain a copy of that profile and could use it as a basis to create his or her own service environment based on the first user's profile. In some cases, a company, which has employees who work at home, could create a service profile that its employees could use to ensure the employees are able to set up their remote working environments in a manner that is consistent with the company policy. The employees could also use the service profile when travelling. In some embodiments, a company selling a particular user device could generate a recommended profile that users could use to assist in setting up their LAN properly to support the new user device. In some instances, a company offering a content service could provide a profile to users to ensure a properly configured environment to support the service. In some cases, in each of these cases, shared objects can be used to validate whether the profile can be supported, or whether the profile is performing as advertised or as desired.

In some embodiments, at least one of the APIs might present a resource or a list(s) of resources to the user as one or more of an Infrastructure as a Service ("IaaS") resource(s) and/or Internet of things ("IoT") resource(s) for portal, application, orchestration integration, and/or control, or the like. The resource itself might include, without limitation, at least one of a physical resource(s), a logical resource(s), a virtual resource(s), an application resource(s), or other resource(s), and/or the like.

Figure 2A:
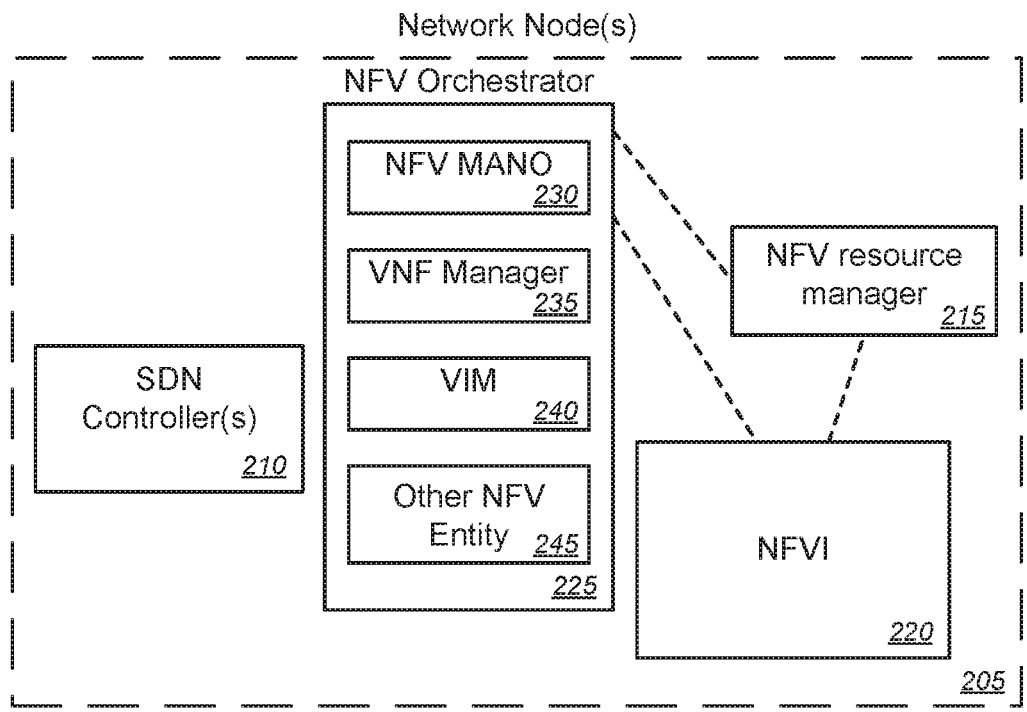
FIG. 2A is a schematic diagram illustrating various embodiments of network nodes that may be used in the system of FIG. 1.
Figure 2B:
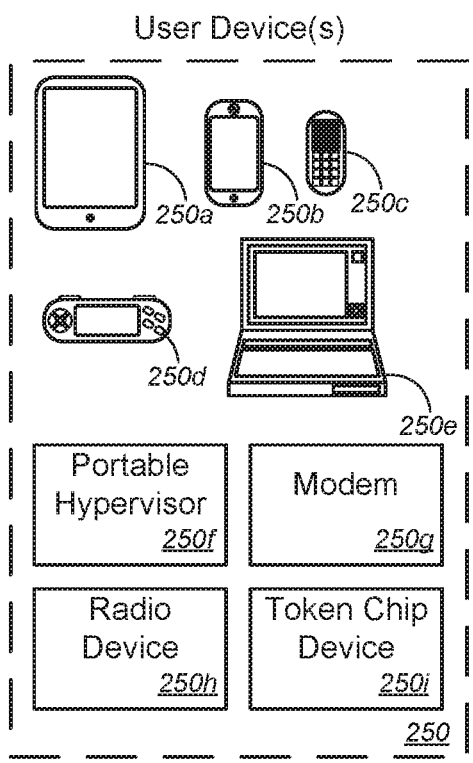
FIG. 2B is a schematic diagram illustrating various embodiments of user devices that may be used in the system of FIG. 1.

FIGS. 2A and 2B (collectively, "FIG. 2") are schematic diagrams illustrating various embodiments of network nodes and user devices, respectively, that may be used in the system of FIG. 1.

With reference to FIG. 2A, network node(s) 205—which might correspond to each of at least one of first node(s) 120, second node(s) 160, network node(s) 135, network node(s) 175, network gateway(s) 185, computing system(s) 190, and/or the like of system 100 in FIG. 1—might each include, without limitation, one of a gateway device, a network switch, a network functions virtualization ("NFV") entity, or a software defined network ("SDN") controller 210, and/or the like, where the NFV entity might include, but is not limited to, at least one of a NFV resource manager 215, a network functions virtualization infrastructure ("NFVI") system 220, a NFV orchestrator 225, a NFV management and orchestration ("MANO") system 230, a VNF manager ("VNFM") 235, a virtualized infrastructure manager ("VIM") 240, a virtual machine ("VM"), a macro orchestrator, a domain orchestrator, or other NFV entity 245, and/or the like.

Referring to FIG. 2B, user device(s) 250—which might correspond to each of user device(s) 110, user device(s) 150, hypervisor(s)/container(s) 115, hypervisor(s)/container(s) 155, and/or the like of system 100 in FIG. 1—might each include, without limitation, one of a tablet computer 250a, a smart phone 250b, a mobile phone 250c, a portable gaming device 250d, a laptop computer 250e, a portable hypervisor 250f, a modem 250g, a radio device 250h, or a token chip device 250i, and/or the like.

The network node(s) 205 and the user device(s) 250 are described in detail here with respect to FIGS. 1 and 3-10, and particular with respect to the methods, systems, and apparatuses for implementing network experience shifting using shared objects, according to the various embodiments.

Figure 3:
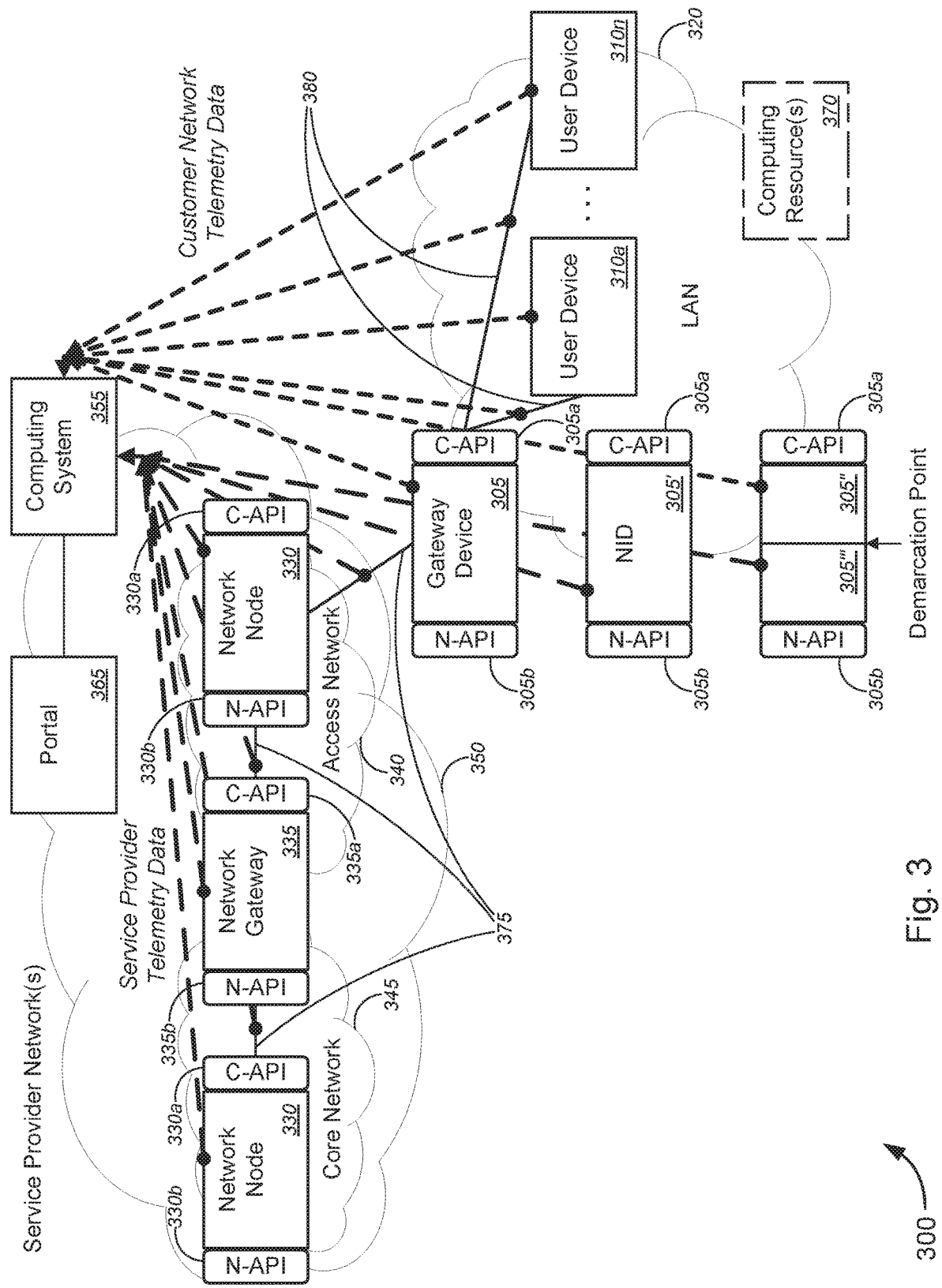
FIG. 3 is a schematic diagram illustrating a system for implementing dual network telemetry application programming interface ("API") framework, in accordance with various embodiments, that may be used when implementing network experience shifting using shared objects.

FIG. 3 is a schematic diagram illustrating a system 300 for implementing dual network telemetry application programming interface ("API") framework, in accordance with various embodiments, that may be used when implementing network experience shifting using shared objects.

In the non-limiting example of FIG. 3, system 300 might comprise gateway devices (e.g., customer location-based gateway 305, service provider associated gateway or network interface device ("NID") 305', gateways 305" and 305'" based in a single device and separated by a demarcation point between LAN 320 and the service provider network(s) 340, 345, and/or 350). System 300 might further comprise user devices 310a-110n (collectively, "user devices 310" or the like), which along with the gateway devices 305, 305', 305", and/or 305'", might be disposed within or in close communication with LAN 320. System 300 might further comprise network nodes 330, network gateway 335, and computing system 355, each of which might be disposed within one or more service provider networks 340, 345, and/or 350. Each of the gateway devices 305, 305', 305", and/or 305'" might comprise a customer network API 305a and a service provider network 305b. Each of network nodes 330 might comprise a customer network API 330a and a service provider network 330b, and the network gateway 335 might comprise a customer network API 335a and a service provider network 335b.

In some embodiments, at least one network node 330 might be disposed in access network 340, while at least one network node 330 might be disposed in a core network 345, and a network gateway 335 might provide an interface (in this case, an internal network-to-network interface ("INNI")) between the at least one network node 330 disposed in access network 340 and the at least one network node 330 disposed in core network 345. The computing system 355 might receive service provider telemetry data from each of the at least one network node 330 disposed in the access network 340, the at least one network node 330 disposed in the core network 345, the network gateway 335, and the NID 305' and/or gateway 305''', along with telemetry data from communications links 375 along the one or more service provider networks 340, 345, and 350 (and between the service provider networks and gateway device 305), as depicted by long dash lines leading from these network components and links toward computing system 355. Similarly, computing system 355 might receive customer network telemetry data from gateway 305 and/or 305'', each of user devices 310, and from communications links 380 between gateway 305 and each of user devices 310, as depicted by dash lines leading from these LAN components and links toward computing system 355.

According to some embodiments, system 300 might further comprise portal 365 which allows a user to access the customer network telemetry data and/or the service provider telemetry data via computing system 355. System 300 might further optionally comprise one or more computing resources 370.

Figure 4A:
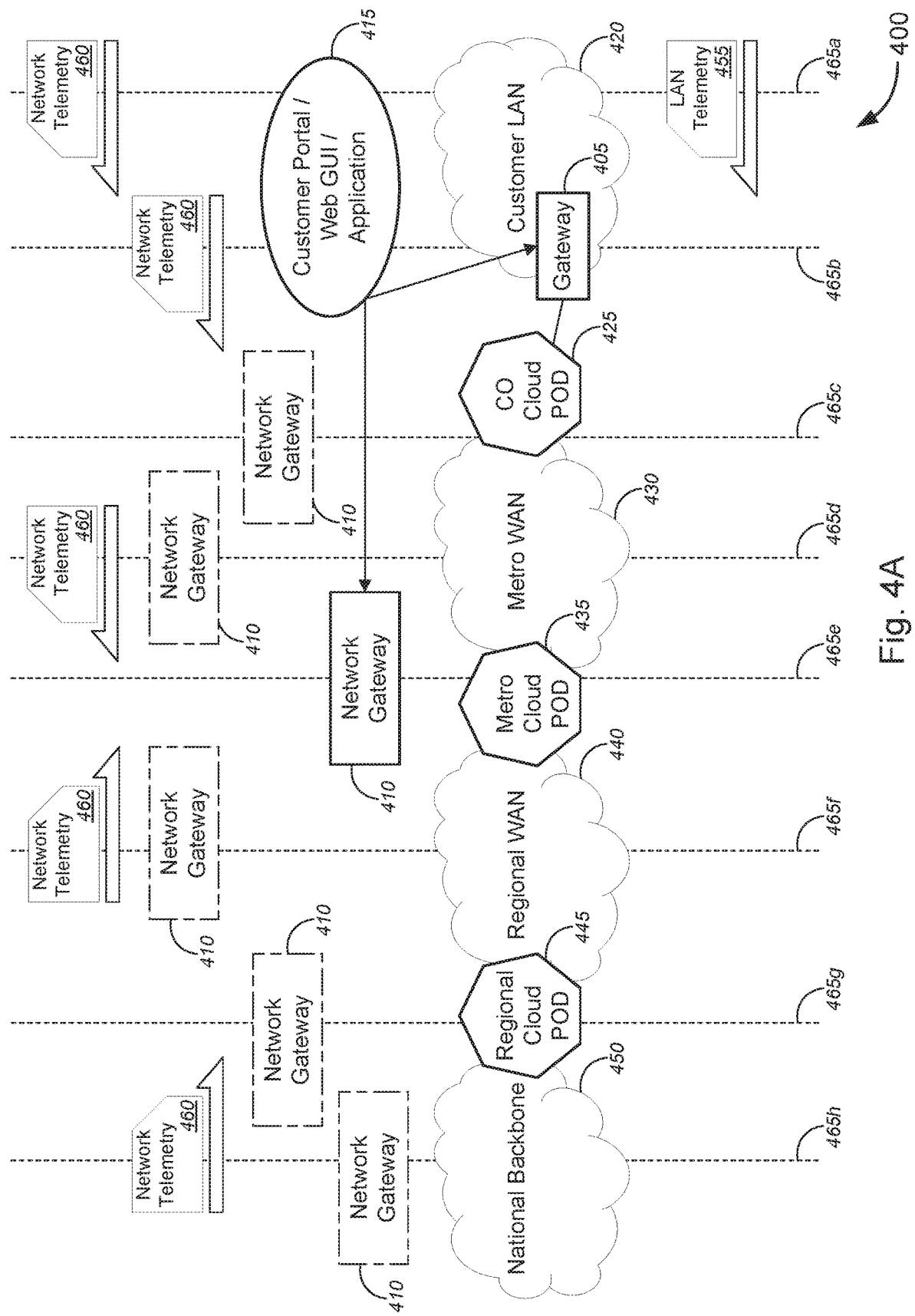
FIGS. 4A and 4B are schematic diagrams illustrating various embodiments of a system that may be used for implementing dual network telemetry API framework that may be used when implementing network experience shifting using shared objects.
Figure 4B:
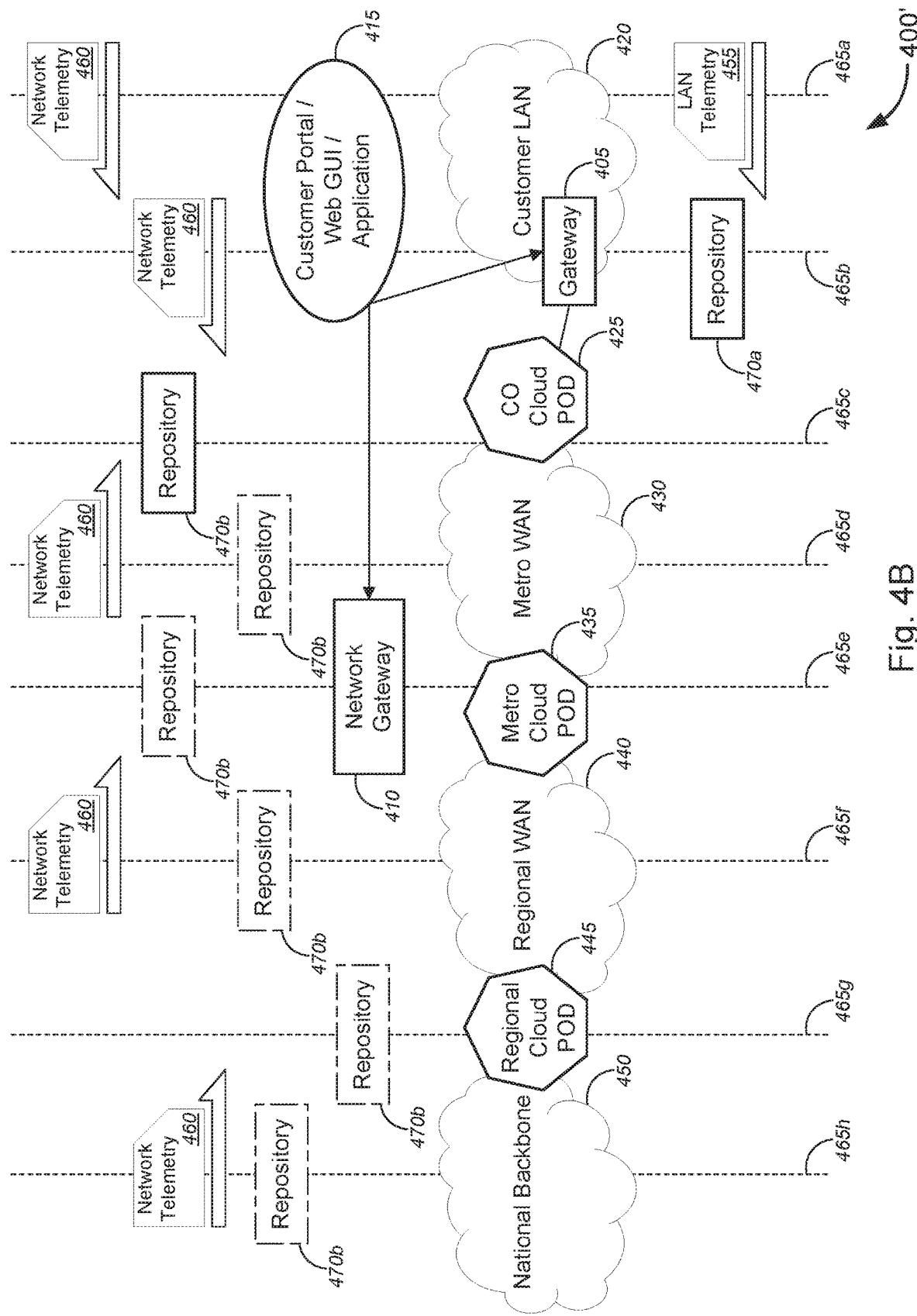

FIGS. 4A and 4B (collectively, "FIG. 4") are schematic diagrams illustrating various embodiments 400 and 400' of a system that may be used for implementing dual network telemetry API framework that may be used when implementing network experience shifting using shared objects.

With reference to FIG. 4A, system 400 might comprise gateway 405, network or API gateway 410, customer portal/web GUI/application 415, customer LAN 420, central office ("CO") cloud point of delivery ("PoD" or "POD") 425, metro WAN 430, metro cloud POD 435, regional WAN 440, regional cloud POD 445, and national backbone 450.

The gateway 405, at point 465b (depicted as a dashed line crossing gateway 405 in LAN 420 in FIG. 4), might receive customer network telemetry 455 from point 465a in LAN 420 (depicted as a dashed line crossing LAN 420 in FIG. 4). Similarly, network or API gateway 410, at point 465e (depicted as a dashed line crossing network or API Gateway 410 in FIG. 4), might receive service provider network telemetry 460 from points 465a, 465b, 465d, 465f, and 465h. In some embodiments, network or API gateway 410 might alternatively be disposed at any of points 465c, 465d, 465f, 465g, or 465h, or the like (depicted as dash-long dash blocks in FIG. 4A). As described above with reference to FIG. 1, according to some embodiments, the customer network telemetry data 455 might be pulled via a gateway device API of the gateway device 405, while the service provider network telemetry data might be pulled from the network nodes (e.g., nodes 115, network nodes 130, and/or computing systems 150, as well) via network API of the network points 465a, 465b, 465d, 465f, and 465h, or the like.

Alternatively, as shown in FIG. 4B, the customer network telemetry data might be published to a first repository 470a (depicted as a dashed line crossing repository 470a and gateway 405 in FIG. 4B) by the gateway device 405, while the service provider network telemetry data might be published to a second repository 470b (depicted as a dashed line crossing repository 470b in FIG. 4B) by the network nodes (e.g., nodes 115, network nodes 130, and/or computing systems 150, as well) via network API of the network points 465a, 465b, 465d, 465f, and 465g, or the like. In some embodiments, the second repository 470b might alternatively be disposed at any of points 465d, 465e, 465f, 465g, or 465h, or the like (depicted as dash-long dash blocks in FIG. 4B). The gateway device 405 and/or the network or API gateway 410 might subscribe to each of the first repository 470a and the second repository 470b to receive the customer network telemetry data and the service provider network telemetry data, respectively. In some cases, the first repository 470a and the second repository 470b might be the same repository.

The gateway 405, the network or API gateway 410, the customer LAN 420, the metro WAN 430, the regional WAN 440, and the national backbone 450 of systems 400 and 400' of FIGS. 4A and 4B are otherwise similar, if not identical, to the gateway 105, nodes 115/network gateway or nodes 130/computing system(s) 150, LAN 120, network(s) 135, network(s) 140, and network(s) 145 of system 100 of FIG. 1, and the descriptions of these components of system 100 are applicable to the corresponding components of systems 400 and 400', respectively.

In system 400 or 400', there are two API interfaces, the NID interface that delivers customer network telemetry and NID telemetry, and the network gateway that provides end-to-end service telemetry. The NID API provides service state information when the access becomes disconnected from the network, and provides real-time information on the access leg. The network API gateway provides state and use information for the end-to-end service and overall service state.

Both interfaces enable applications, cloud portals, and web browsers to customer network telemetry information on the access, NID, and the network or E2E service.

In some embodiments, the NID API might add a "HTTP REST" server function to the NID admin portal that is typically GUI or HTTP based. All NID telemetry can be shared via that modified HTTP function. Service Attributes that are not normally on the NID may also be added by creating a HTTP re-direct type function to bounce any service model request to a centralized webserver to display the information. Some NIDs might have cloud publication/subscription feature built in. These functions can transmit near-real-time usage data to a subscriber just as a stock ticker function works. In this manner, applications and portals can obtain real-time updates on live utilization, this is described under the API functional set.

According to some embodiments, one key requirement to opening a telemetry API to the customer LAN is to ensure the customer understands that opening the interface enables applications to access the information. It may be necessary to create an application registry to track what application is using what information, which is beyond the scope of this initial specification. In some cases, a means for billing for certain telemetry data may additionally be made available via one or more API's, in some cases based on the application registry or some other tracking functionality. In some embodiments, levels of authentication may be implemented to ensure that only authorized entities can gain access to the telemetry data (via either the gateway API or the network API, or similarly via the customer network API or service provider API, or the like).

This specification does recommend that the customer needs to have the ability to open the API on their NID, and when doing so an acknowledgement that the information made available type message and acceptance needs to occur.

Figure 5:
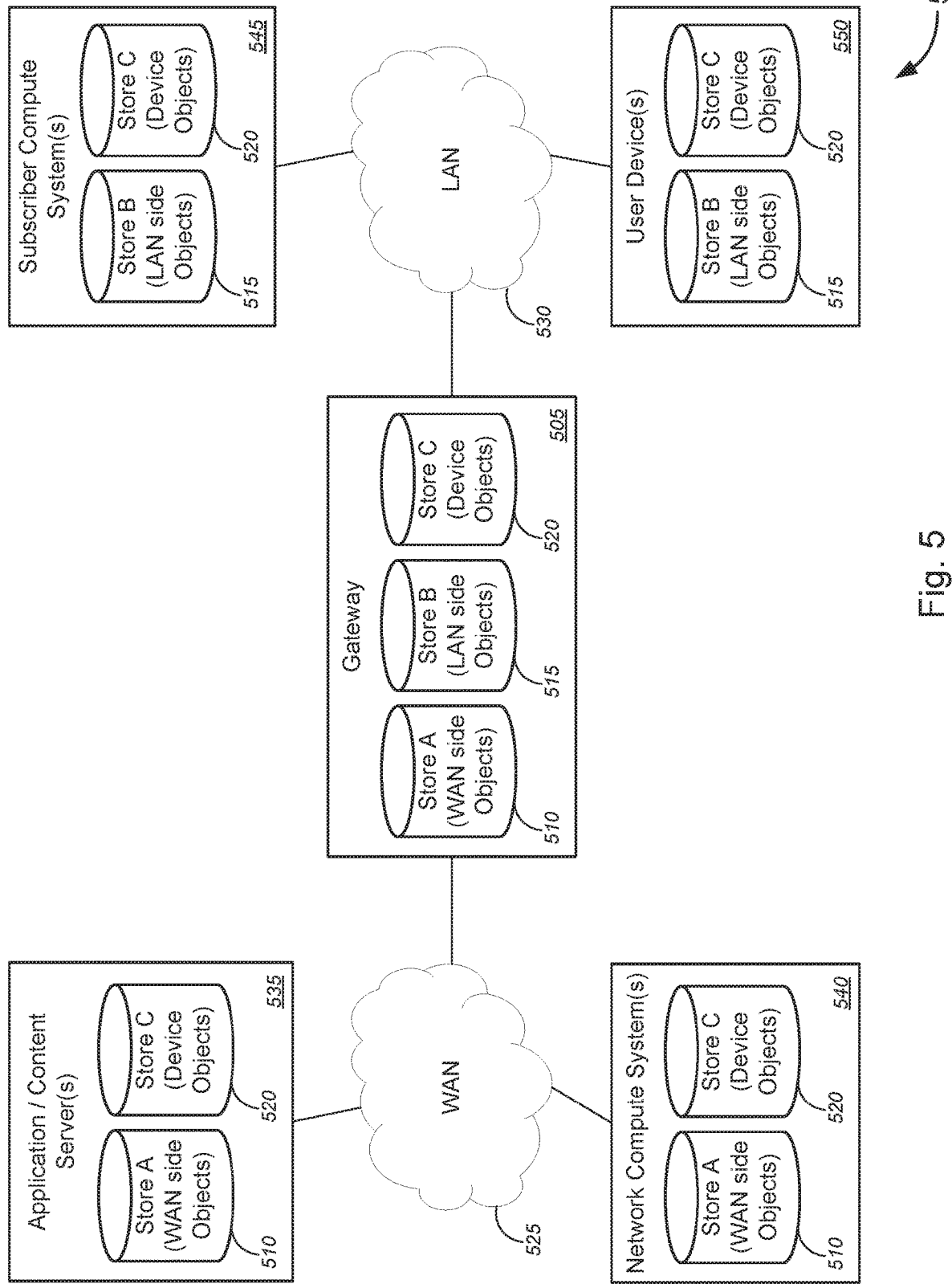
FIG. 5 is a schematic diagram illustrating another system that may be used for implementing dual network telemetry API framework, in accordance with various embodiments, that may be used when implementing network experience shifting using shared objects.

FIG. 5 is a schematic diagram illustrating another system 500 that may be used for implementing dual network telemetry API framework, in accordance with various embodiments, that may be used when implementing network experience shifting using shared objects.

In the non-limiting embodiment of FIG. 5, system 500 might comprise gateway device 505, which might comprise store A 510 (which might store WAN-side shared objects), store B 515 (which might store LAN-side shared objects), and store C 520 (which might store device-based shared objects). System 500 might further comprise WAN 525 and LAN 530. System 500 might further comprise one or more application/content servers 535, one or more network compute systems 540, one or more subscriber compute systems 545, and one or more user devices 550, and/or the like. The one or more application/content servers 535 might comprise store A 510 and store C 520. The one or more network compute systems 540 might comprise store A 510 and store C 520. The one or more subscriber compute systems 545 might comprise store B 515 and store C 520. The one or more user devices 550 might comprise store B 515 and store C 520.

In some embodiments, the gateway 505, the subscriber compute system(s) 545, and the user device(s) 550 might each comprise a gateway API via which LAN side shared objects might be received from LAN 530 for storage in corresponding stores B 515 in each of the gateway 505, the subscriber compute system(s) 545, and the user device(s) 550, respectively. Similarly, the gateway 505, the application/content server(s) 535, and the network compute system(s) 540 might each comprise a network API via which WAN side shared objects might be received from WAN 525 (and in some cases, LAN 530 as well) for storage in corresponding stores A 510 in each of the gateway 505, the application/content server(s) 535, and the network compute system(s) 540, respectively.

Figure 6:
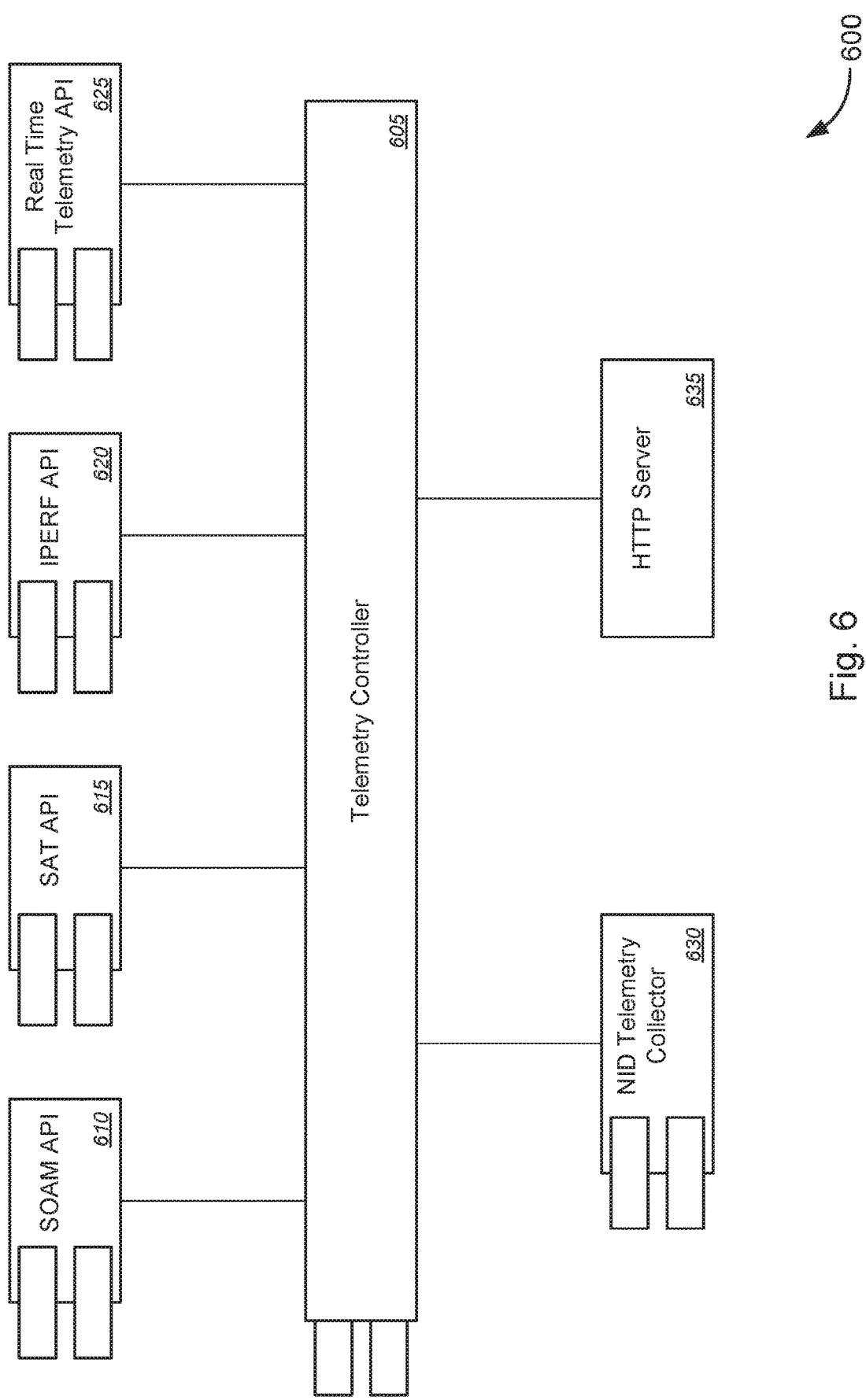
FIG. 6 is a schematic diagram illustrating a telemetry engine that may be used for implementing dual network telemetry API framework, in accordance with various embodiments, that may be used when implementing network experience shifting using shared objects.

FIG. 6 is a schematic diagram illustrating a telemetry engine 600 that may be used for implementing dual network telemetry API framework, in accordance with various embodiments, that may be used when implementing network experience shifting using shared objects.

In the non-limiting embodiment of FIG. 6, system 600 might comprise telemetry controller 605, service operations, administration, and management ("Service OAM" or "SOAM") API 610, service activation testing ("SAT") API 615, Iperf network performance measurement and tuning API 620, real-time telemetry API 625, NID telemetry collector 630, and HTTP server 635.

The functionality of the set of telemetry APIs might include using a functional component design that can be implemented using micro services. A telemetry controller 605 might be responsible for the communications and coordination between supporting functional components. A set of first telemetry APIs could include the SOAM API 610, the SAT API 615, the IPERF API 620, and real-time telemetry API 625. These APIs among other APIs can be defined and built. The NID telemetry collector 630 might be responsible for accessing NID network and service specific attributes and making such attributes accessible. The HTTP server 635 might be needed to provide REST API server side functionality as well as HTTP portal access.

Figure 7:
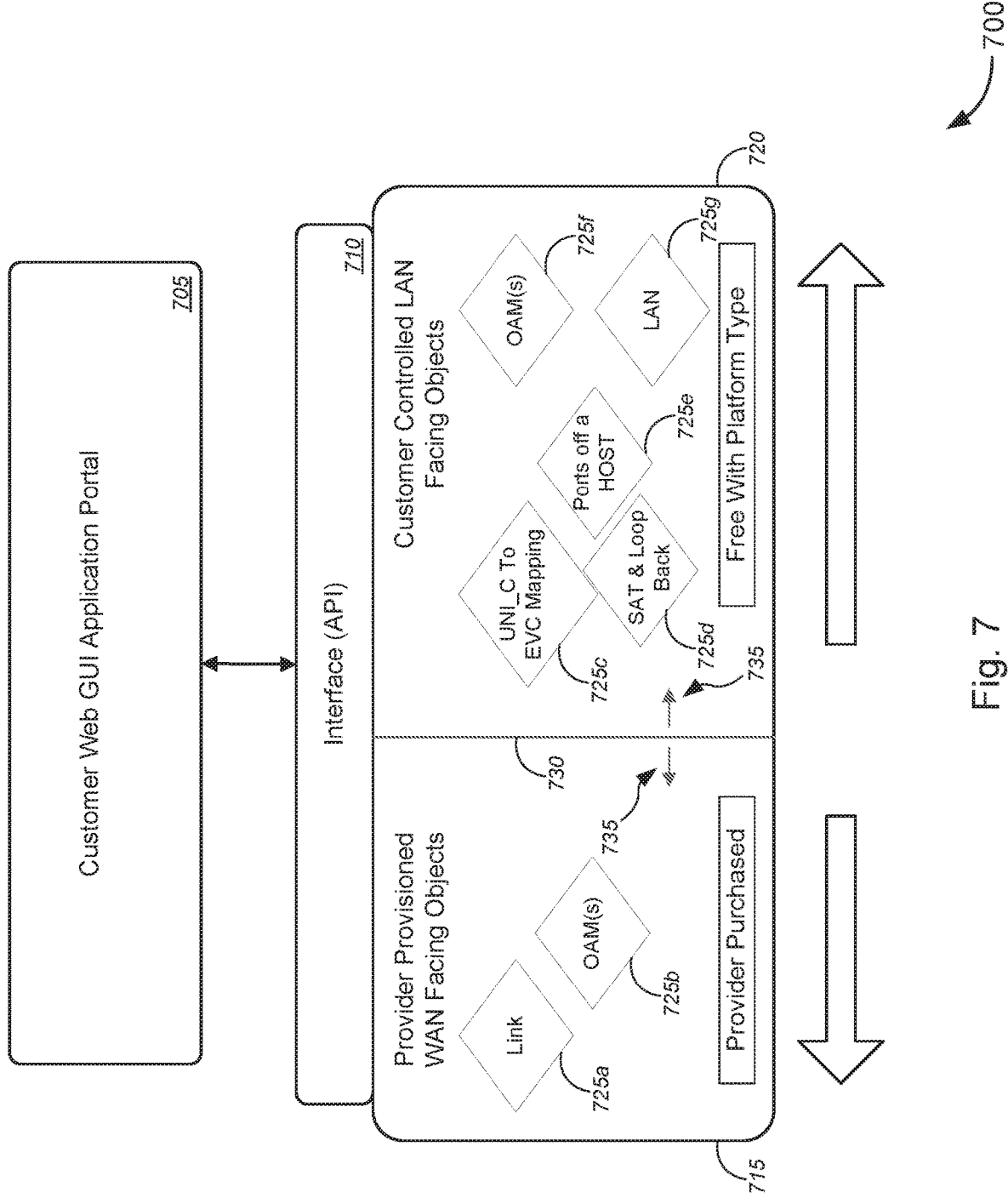
FIG. 7 is a schematic diagram illustrating yet another system that may be used for implementing dual network telemetry API framework, in accordance with various embodiments, that may be used when implementing network experience shifting using shared objects.

FIG. 7 is a schematic diagram illustrating yet another system 700 that may be used for implementing dual network telemetry API framework, in accordance with various embodiments, that may be used when implementing network experience shifting using shared objects.

In the non-limiting embodiment of FIG. 7, system 700 might comprise customer web graphical user interface ("GUI") application portal 705, interface (or API) 710, provider provisioned WAN facing shared objects 715 and customer controlled LAN facing shared objects 720. System 700 might comprise link 725a, OAM(s) 725b, UNI_C to EVC Mapping 725c, SAT & Loop Back 725d, Ports off a Host 725e, OAM(s) 725f, and LAN 725g.

In operation, interface (and/or API) 710 might shift shared objects 725a, 725b, 725c, 725d, 725e, 725f, and 725g from the WAN side 715 to the LAN side 710, or vice versa, by moving line 730 WAN-side or LAN-side 735. According to some embodiments, although not specifically shown in FIG. 7, the shared objects 725 might also include, without limitation, telemetry information about one or more devices and/or information about one or more network resources either on the WAN side 715 and/or on the LAN side 710.

Figure 8:
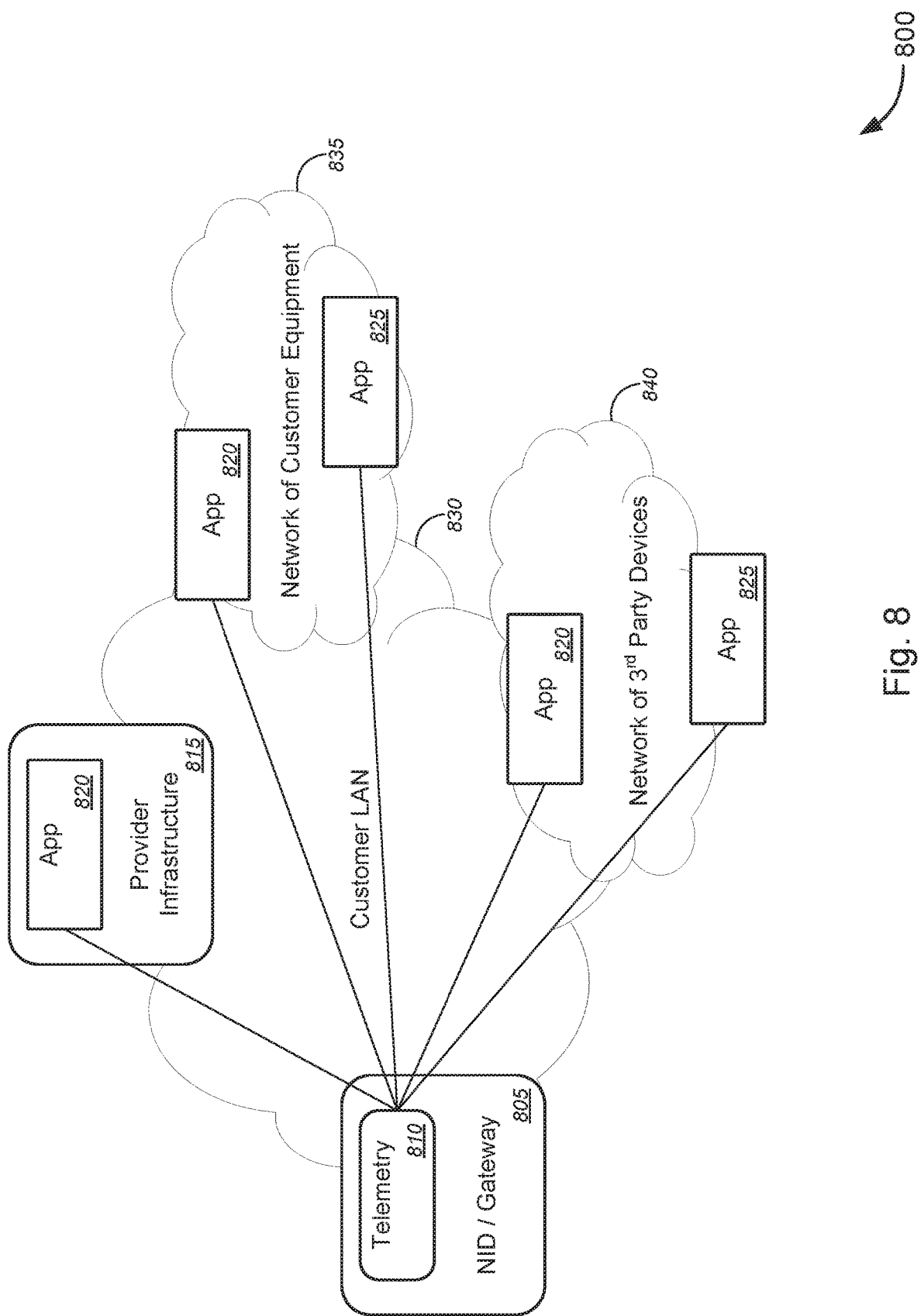
FIG. 8 is a schematic diagram illustrating another system that may be used for implementing dual network telemetry API framework, in accordance with various embodiments, that may be used when implementing network experience shifting using shared objects.

FIG. 8 is a schematic diagram illustrating another system 800 that may be used for implementing dual network telemetry API framework, in accordance with various embodiments, that may be used when implementing network experience shifting using shared objects.

In the non-limited embodiment of FIG. 8, system 800 might comprise NID/gateway 805, telemetry 810, provider infrastructure 815, first apps 820, second apps 825, customer LAN 830, network of customer equipment 835, and network of third party device 840.

In some embodiments, the API service might provide telemetry on user shared objects or user managed objects that contain information on user purchased services, configurations, and their usage. Given these are customer proprietary information, the user must open the API for specific types of use, and there must be "disclose statement" information notifying the customer that they are exposing the telemetry at that specific interface. In some cases, a billing system or billing server(s) may be made available to bill users or third party members for certain telemetry data via one or more API's, in some cases in response to tracking performed by the application registry or some other tracking functionality. In some embodiments, levels of authentication may be implemented to ensure that only authorized entities can gain access to the telemetry data (via either the gateway API or the network API, or similarly via the customer network API or service provider API, or the like). With reference to FIG. 8, both non-provider and provider applications can access the API. According to some embodiments, applications hosted on the provider platform could meet the provider privacy policy and would be available via the provider application market place. Provider applications are not limited to the provider platform, however, applications that use the API may exist outside of the provider market place, and the behavior of those non-provider applications are governed only by the application coder. In some embodiments, a provider application market place might include first apps 820, which might be tested and certified to meet provider privacy compliance. Customer applications, Internet, and commercially available applications (e.g., second apps 825) have their own policy compliance statements.

Figure 9A:
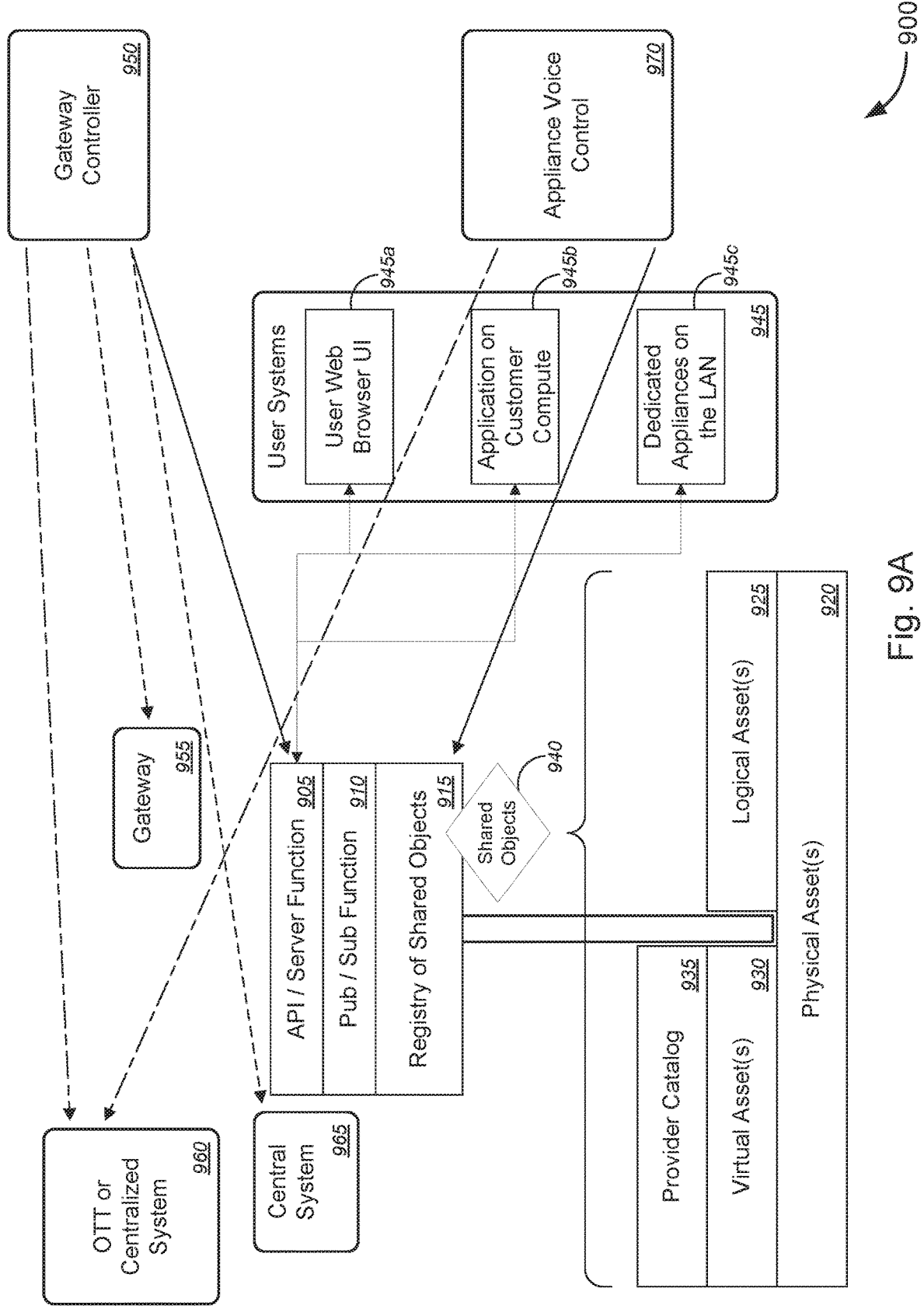
FIGS. 9A and 9B are schematic diagrams illustrating various embodiments of a system that may be used for implementing dual network telemetry API framework that may be used when implementing network experience shifting using shared objects.
Figure 9B:
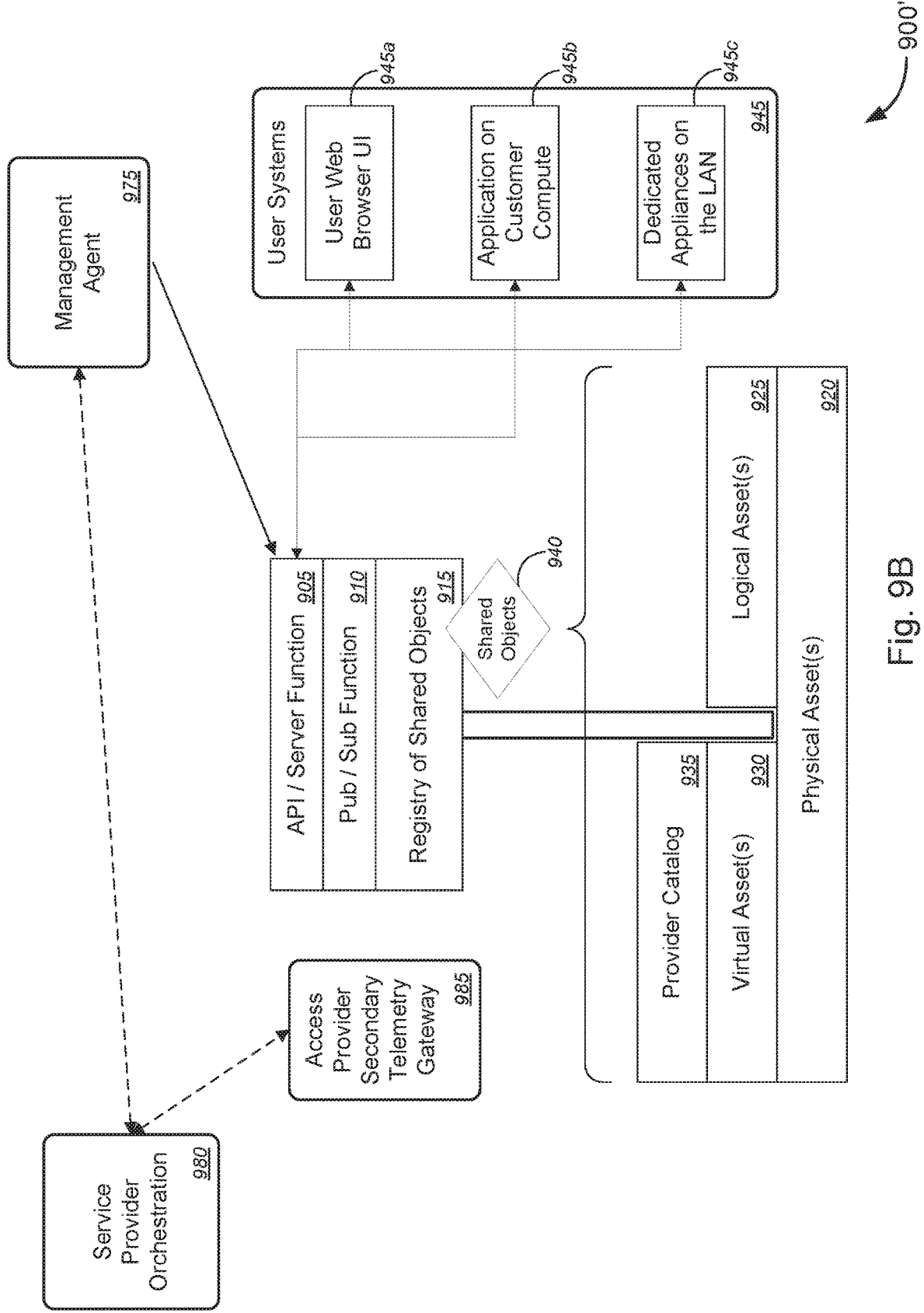

FIGS. 9A and 9B (collectively, "FIG. 9") are schematic diagrams illustrating various embodiments 900 and 900' of a system that may be used for implementing dual network telemetry API framework that may be used when implementing network experience shifting using shared objects.

In the non-limiting embodiment of FIG. 9A, system 900 might comprise API/server function 905, publication/subscription (pub/sub) function 910, registry of shared objects 915, physical assets 920, logical assets 925, virtual assets 930, provider catalog 935, shared objects 940, user systems 945, gateway controller 950, gateway device 955, over-the-top ("OTT") or centralized system 960, central system 965, appliance voice control 970, and/or the like. The user systems 945 might comprise user web browser user interface ("UI") 945*a*, application on customer compute 945*b*, and dedicated appliances on the LAN 945*c*.

Historically, OTT and/or Internet of things ("IoT") applications, devices, and systems might only have understanding of the base connectivity which is derived from IP layer mechanisms such as ping, and congestion indications on throughput. Gateway controller functions like call admission control ("CAC") might not be in the foreign host/NID, and thus this controller engine performs those specialized functions.

In some embodiments, applications can use the shared object or managed object telemetry raw directly off the NID. Alternatively, applications can use the gateway/management agent controller to access derived indicator based on the raw telemetry. According to some embodiments, gateway, management agent, and/or controller functions might include, but are not limited to, enabling automation via a customizable machine to machine set of objects, being located locally, being located on a NID, or being located remotely, implementing big data collection from all the shared objects or managed objects (including an ability to group save different data sets for derived or charting type analysis, to collect data from IoT or other sensors, or the like), implementing dynamic or load balancing based on call admission control for applications using bandwidth, state, etc. (e.g., by creating one's own thresholds for using the access, or the like), implementing customizable derived states by using triggers/thresholds based on raw object data and big data from sensors (e.g., by creating one's own thresholds for using the access, or the like), and/or the like.

With reference to FIG. 9B, system 900' might comprise API/server function 905, publication/subscription function 910, registry of shared objects 915, physical assets 920, logical assets 925, virtual assets 930, provider catalog 935, shared objects 940, user systems 945, management agent 975, service provider orchestration 980, and access provider secondary telemetry gateway 985.

According to some embodiments, the access provider installs a service provider application on a customer premises equipment ("CPE") device to let the provider use or manage the shared objects on the access provider NID. In some embodiments, key functions of the management agent 975 might include, without limitation, boot strap function, agent proxy function, configuration information pulling function, and/or the like. In some cases, the boot strap function might call home to a service provider system to register itself and to initiate service provider configuration. This can be accomplished via use of uniform resource locator ("URL") address, pre-provisioned address, transport layer security ("TLS") encryption, tokens, and/or the like. The management agent registers the shared objects or managed objects in the NID under itself for the service provider. In some instances, the agent proxy function might contain a registry, a publication/subscription ("pub/sub") agent, and a HTTP rest agent that gathers telemetry information from the shared objects or managed objects and that enables the provider to perform pull commands, to perform push commands, and/or to subscribe to telemetry information at will. Other agent proxy functions might also include dying gasp functions (which sends out notifications indicating that it will soon lose functionality, lose power, lose connectivity, or otherwise malfunction, etc.), or the like. In some embodiments, the configuration information pulling function might include pulling configuration information from an access provider NID for a fall back telemetry interface, and sending that information to the service provider orchestration system in case the NID is unreachable.

Merely by way of example, in some aspects, the management agent 975 might include, but are not limited to, an agent registry with objects (to facilitate the boot strapping), an agent state machine (to track if the agent is reachable), a secondary telemetry gateway 985, and/or the like. In some instances, the agent state machine might track if the management agent is reachable. If the management is not reachable, the system can execute reachability tests and/or use a secondary access provider system API to relate telemetry about the unreachable access provider NID. In some cases, the secondary telemetry gateway 985 might provide telemetry and/or state information about a NID when the access NID is unreachable. This may include, without limitation, a trouble ticket state in which the service provider and the user portal can have machine to machine resolution visibility, and/or the like.

FIGS. 10A-10H (collectively, "FIG. 10") are flow diagrams illustrating a method 1000 for implementing network experience shifting using shared objects, in accordance with various embodiments. Method 1000 of FIG. 10A continues onto FIG. 10B following the circular marker denoted, "A," continues from FIG. 10A onto FIG. 10C following the circular marker denoted, "B," and continues from FIG. 10A onto FIG. 10D following the circular marker denoted, "C."

While the techniques and procedures are depicted and/or described in a certain order for purposes of illustration, it should be appreciated that certain procedures may be reordered and/or omitted within the scope of various embodiments. Moreover, while the method 1000 illustrated by FIG. 10 can be implemented by or with (and, in some cases, are described below with respect to) the systems or embodiments 100, 300, 400, 400', 500, 600, 700, 800, 900, and 900' of FIGS. 1, 3, 4A, 4B, 5, 6, 7, 8, 9A, and 9B, respectively (or components thereof), such methods may also be implemented using any suitable hardware (or software) implementation. Similarly, while each of the systems or embodiments 100, 300, 400, 400', 500, 600, 700, 800, 900, and 900' of FIGS. 1, 3, 4A, 4B, 5, 6, 7, 8, 9A, and 9B, respectively (or components thereof), can operate according to the method 1000 illustrated by FIG. 10 (e.g., by executing instructions embodied on a computer readable medium), the systems or embodiments 100, 300, 400, 400', 500, 600, 700, 800, 900, and 900' of FIGS. 1, 3, 4A, 4B, 5, 6, 7, 8, 9A, and 9B can each also operate according to other modes of operation and/or perform other suitable procedures.

Figure 10A:
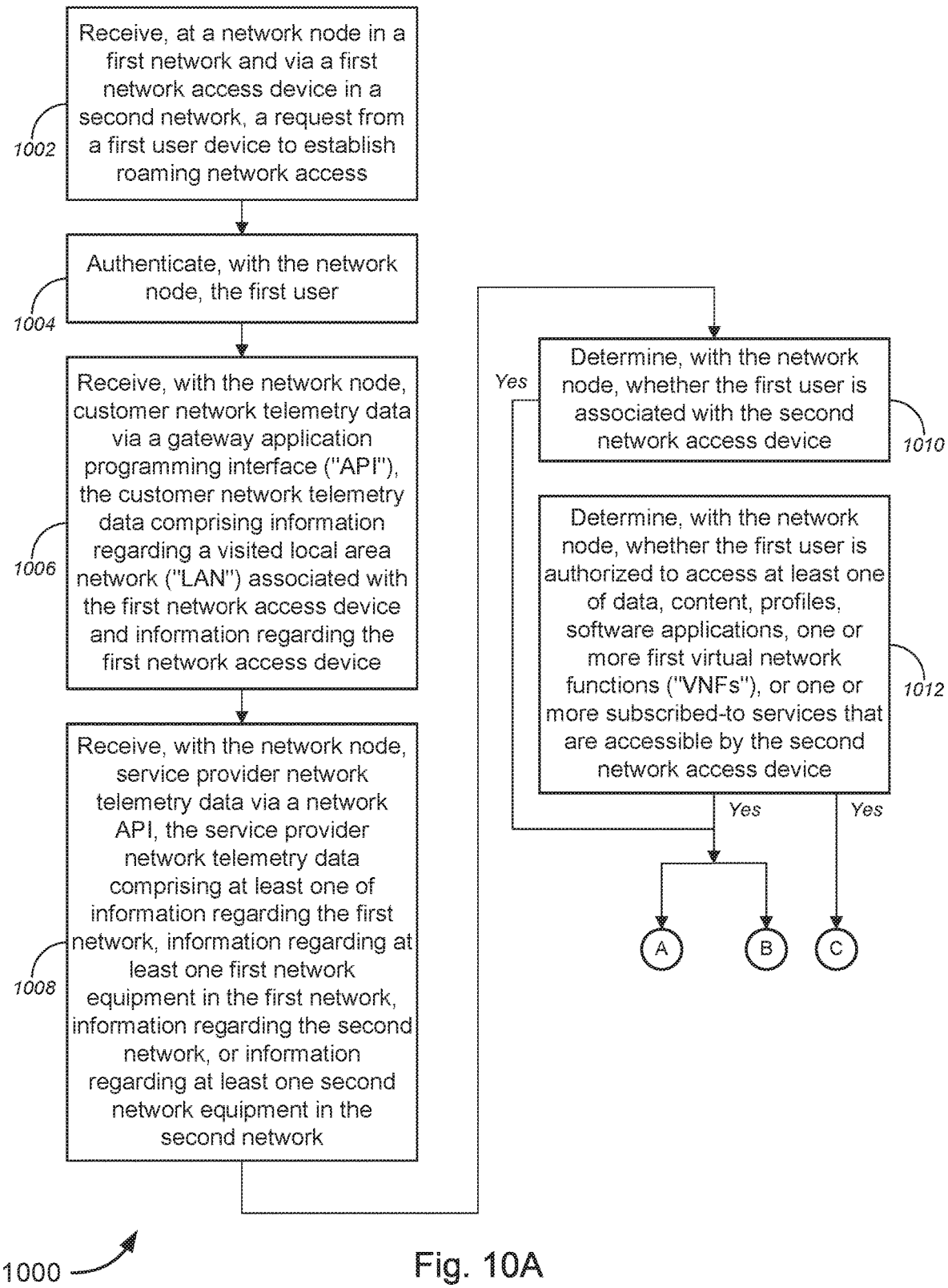

In the non-limiting embodiment of FIG. 10A, method 1000, at block 1002, receiving, at a network node in a first network and via a first network access device in a second network, a request from a first user device to establish roaming network access, a first user of the first user device being associated with a second network access device in the first network and being unassociated with the first network access device, the second network access device being located in a different geographical location from the first network access device. In some cases, the request from the first user device might be automatically sent from the first user device via the first network access device, without user input from the first user. In some instances, the first user device and the first network access device communicate with each other using at least one of machine-to-machine ("M2M") communication, M2M protocols, Internet of Things ("IoT") communication, IoT protocols, or IoT proxy functions, and/or the like. At block 1004, method 1000 might comprise authenticating, with the network node, the first user.

According to some embodiments, the network node might include, without limitation, one of a gateway device, a network switch, a network functions virtualization ("NFV") entity, or a software defined network ("SDN") controller, wherein the NFV entity comprises at least one of a NFV orchestrator, a network functions virtualization infrastructure ("NFVI") system, a NFV management and orchestration ("MANO") system, a VNF manager ("VNFM"), a NFV resource manager, a virtualized infrastructure manager ("VIM"), a virtual machine ("VM"), a macro orchestrator, or a domain orchestrator, and/or the like. In some embodiments, the first user device might include, but is not limited to, one of a tablet computer, a smart phone, a mobile phone, a portable gaming device, a laptop computer, a portable hypervisor, a modem, a radio device, or a token chip device, and/or the like.

In some cases, the first network access device and the second network access device might each include, without limitation, at least one of a customer premises equipment ("CPE"), a router, a switch, a network element, a demarcation device, a WiFi gateway device, a hypervisor platform, one or more virtual machine-based host machines, or a network node capable of hosting a hypervisor, and/or the like. In some instances, the CPE might include, but is not limited to, at least one of an optical network terminal ("ONT"), a network interface device ("NID"), an enhanced NID ("eNID"), a residential gateway ("RG") device, a business gateway ("BG") device, a virtual gateway ("vG") device, an integrated cable modem/gateway, an integrated radio/gateway, or an integrated transceiver gateway device, and/or the like. In some embodiments, the first network and the second network might be associated with the same network service provider. Alternatively, the first network and the second network might be associated with different network service providers.

Method 1000 might further comprise receiving, with the network node, customer network telemetry data via a gateway application programming interface ("API"), the customer network telemetry data comprising information regarding a visited local area network ("LAN") associated with the first network access device and information regarding the first network access device (block 1006) and receiving, with the network node, service provider network telemetry data via a network API, the service provider network telemetry data comprising at least one of information regarding the first network, information regarding at least one first network equipment in the first network, information regarding the second network, or information regarding at least one second network equipment in the second network (block 1008).

Method 1000 might further comprise determining, with the network node, whether the first user is associated with the second network access device (block 1010) and determining, with the network node, whether the first user is authorized to access at least one of data, content, profiles, software applications, one or more first virtual network functions ("VNFs"), or one or more subscribed-to services that are accessible by the second network access device (block 1012). The process at blocks 1010 and 1012 might continue onto FIGS. 10B, 10C, and 10D, following circular markers denoted, "A," "B," and "C," respectively.

In FIG. 10B, following circular marker, "A," from blocks 1010 and 1012, method 1000 might comprise, based on a determination that the first user is associated with the second network access device and that the first user is authorized to access at least one of data, content, profiles, software applications, one or more first VNFs, or one or more subscribed-to services that are accessible by the second network access device, determining, with the network node, whether at least one of the visited LAN or the first network access device comprises at least one of hardware, software, network functionality, or configuration that is capable of simulating an interface environment of at least one of a home LAN that is associated with the first user, a work LAN that is associated with the first user, or the second network access device (block 1014).

Method 1000, at block 1016, might comprise, based on a determination that at least one of the visited LAN or the first network access device comprises at least one of hardware, software, network functionality, or configuration that is capable of simulating an interface environment of at least one of the home LAN that is associated with the first user, the work LAN that is associated with the first user, or the second network access device, configuring, with the network node, the at least one of the visited LAN or the first network access device to simulate the interface environment of the at least one of the home LAN that is associated with the first user, the work LAN that is associated with the first user, or the second network access device.

With reference to FIG. 10C, following circular marker, "B," from blocks 1010 and 1012, method 1000 might comprise, based on a determination that the first user is associated with the second network access device and that the first user is authorized to access at least one of data, content, profiles, software applications, one or more first VNFs, or one or more subscribed-to services that are accessible by the second network access device, establishing, with the network node, a secure private LAN between the first network access device and the second network access device over the first network and the second network (block 1018).

Figure 10D:
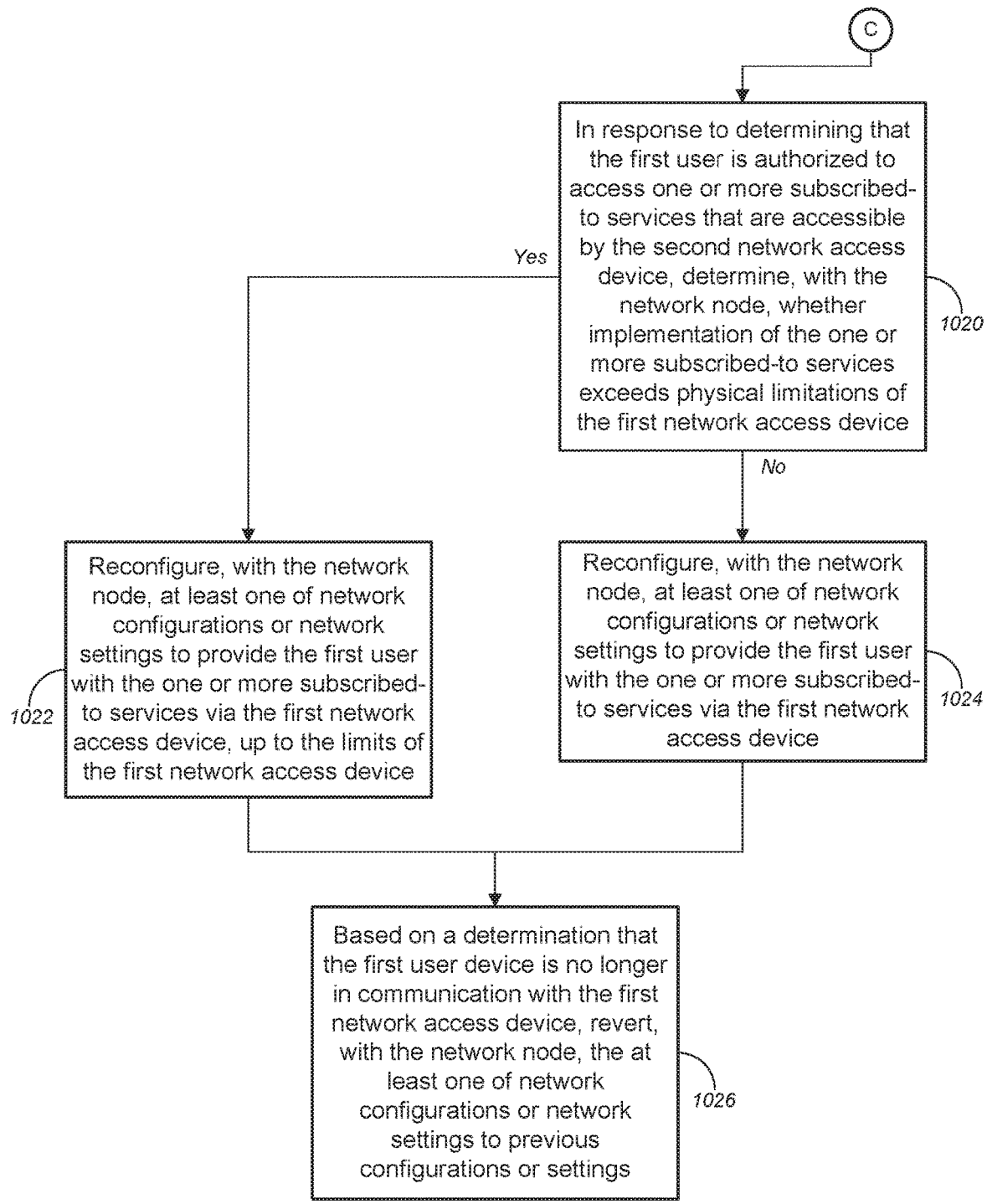

Turning to FIG. 10D, following circular marker, "C," from block 1012, method 1000 might comprise, in response to determining that the first user is authorized to access one or more subscribed-to services that are accessible by the second network access device, determining, with the network node, whether implementation of the one or more subscribed-to services exceeds physical limitations of the first network access device (block 1020); based on a determination that implementation of the one or more subscribed-to services exceeds physical limitations of the first network access device, reconfiguring, with the network node, at least one of network configurations or network settings to provide the first user with the one or more subscribed-to services via the first network access device, up to the limits of the first network access device (block 1022); based on a determination that implementation of the one or more subscribed-to services is within capabilities of the first network access device, reconfiguring, with the network node, at least one of network configurations or network settings to provide the first user with the one or more subscribed-to services via the first network access device (block 1024); and based on a determination that the first user device is no longer in communication with the first network access device, reverting, with the network node, the at least one of network configurations or network settings to previous configurations or settings (block 1026).

Referring to FIG. 10E, method 1000 might further comprise providing, with the network node, one or more second VNFs to at least one of one or more hypervisors or the one or more containers that is in communication with the first network access device and executing instances of the one or more second VNFs on the at least one of one or more hypervisors or the one or more containers, wherein each of the at least one of one or more hypervisors or the one or more containers comprises a compute resource, a memory, and a storage (block 1028) and establishing, with the network node, access connection to a data store by executing the instances of the one or more second VNFs on the at least one of one or more hypervisors or the one or more containers, the data store containing the at least one of data, content, profiles, software applications, one or more first VNFs, or network configuration information for one or more subscribed-to services that are accessible by the second network access device (block 1030).

According to some embodiments, the at least one of one or more hypervisors or the one or more containers might be one of integrated with the first network access device, communicatively coupled to a host port of the first network access device, communicatively coupled to a universal serial bus ("USB") port of the first network access device, communicatively coupled to a local area network ("LAN") port of the first network access device, or communicatively coupled to a communication port of the first network access device that is different from any of the host port, the USB port, and the LAN port, and/or the like. In some embodiments, the at least one of one or more hypervisors or the one or more containers and the first user device might be associated with the first user and unassociated with the first network access device or any network nodes in the second network. In some cases, the at least one of one or more hypervisors or the one or more containers and the first user device might be the same device, and might be embodied as a roaming hypervisor. The one or more second VNFs that are provided to the roaming hypervisor might be VNFs that are already subscribed to by the first user.

In some embodiments, authenticating, with the network node, the first user (at block 1004) might comprise establishing, with the at least one of one or more hypervisors or the one or more containers, a communication link with the second network access device via the network node (block 1032); and authenticating the at least one of one or more hypervisors or the one or more containers using one of the second network access device or the network node (block 1034).

Alternatively, or additionally, with reference to FIG. 10F, authenticating, with the network node, the first user (at block 1004) might comprise establishing a communication link with a portal (block 1036); receiving, at the portal, authentication information from at least one of the first user or the first user device (block 1038); and authenticating, via the portal, the first user based on the received authentication information (block 1040).

Figure 10G:
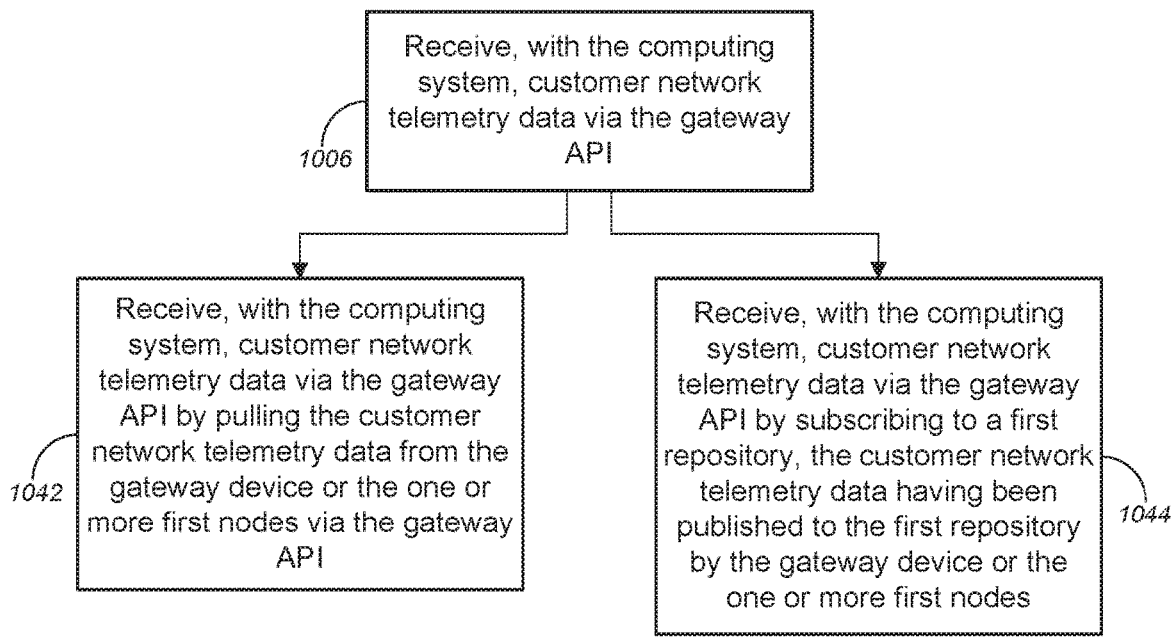

With reference to FIG. 10G, receiving the customer network telemetry data via the gateway API (at block 1006) might comprise receiving, with the computing system, customer network telemetry data via the gateway API by pulling the customer network telemetry data from the gateway device or the one or more first nodes of the LAN via the gateway API (block 1042). Alternatively, or additionally, the customer network telemetry data might be published to a first repository by at least one first node of the one or more first nodes in the LAN, and receiving the customer network telemetry data via the gateway API (at block 1006) might comprise receiving, with the computing system, customer network telemetry data via the gateway API by subscribing to the first repository (block 1044).

Figure 10H:
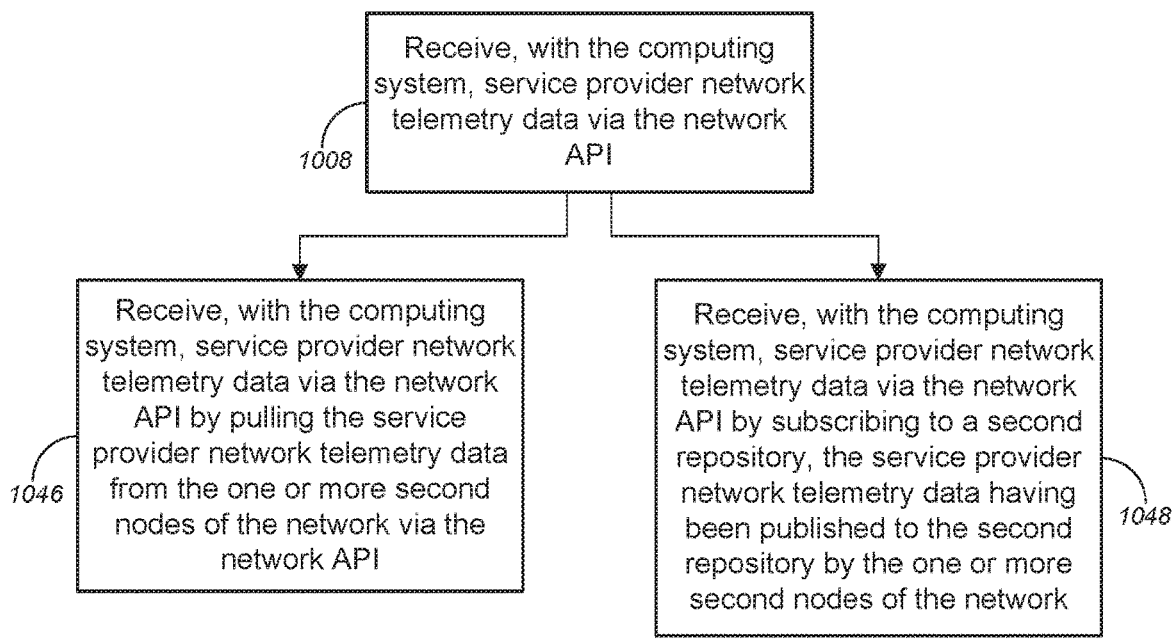

Turning to FIG. 10H, receiving the service provider network telemetry data via the network API (at block 1008) might comprise receiving, with the computing system, service provider network telemetry data via the network API by pulling the service provider network telemetry data from the one or more second nodes of each of the one or more service provider networks via the network API (block 1046). Alternatively, or additionally, the service provider network telemetry data might be published to a second repository by at least one second node of the one or more second nodes in each of the one or more service provider networks, and receiving the service provider network telemetry data via the network API (at block 1008) might comprise receiving, with the computing system, service provider network telemetry data via the network API by subscribing to the second repository (block 1048).

In some embodiments, the customer network telemetry data and the service provider network telemetry data might each include, without limitation, at least one of service operations, administration, and management ("Service OAM") data, service activation testing ("SAT") data, Iperf network performance measurement and tuning data, real-time statistics data, transmitted frame information, received frame information, transmitted packet information, received packet information, information regarding a processing unit of the gateway device, information regarding processing units of each of the one or more first nodes, information regarding processing units of each of the one or more second nodes, alarm indication signal ("AIS") data, data regarding whether one or more nodes are powered, data regarding whether one or more nodes are connected, device identification information of each of one or more nodes, device capability information of each of one or more nodes, resource consumption information for each of one or more network resources, or resource consumption information by each of one or more devices, and/or the like.

Exemplary System and Hardware Implementation

Figure 11:
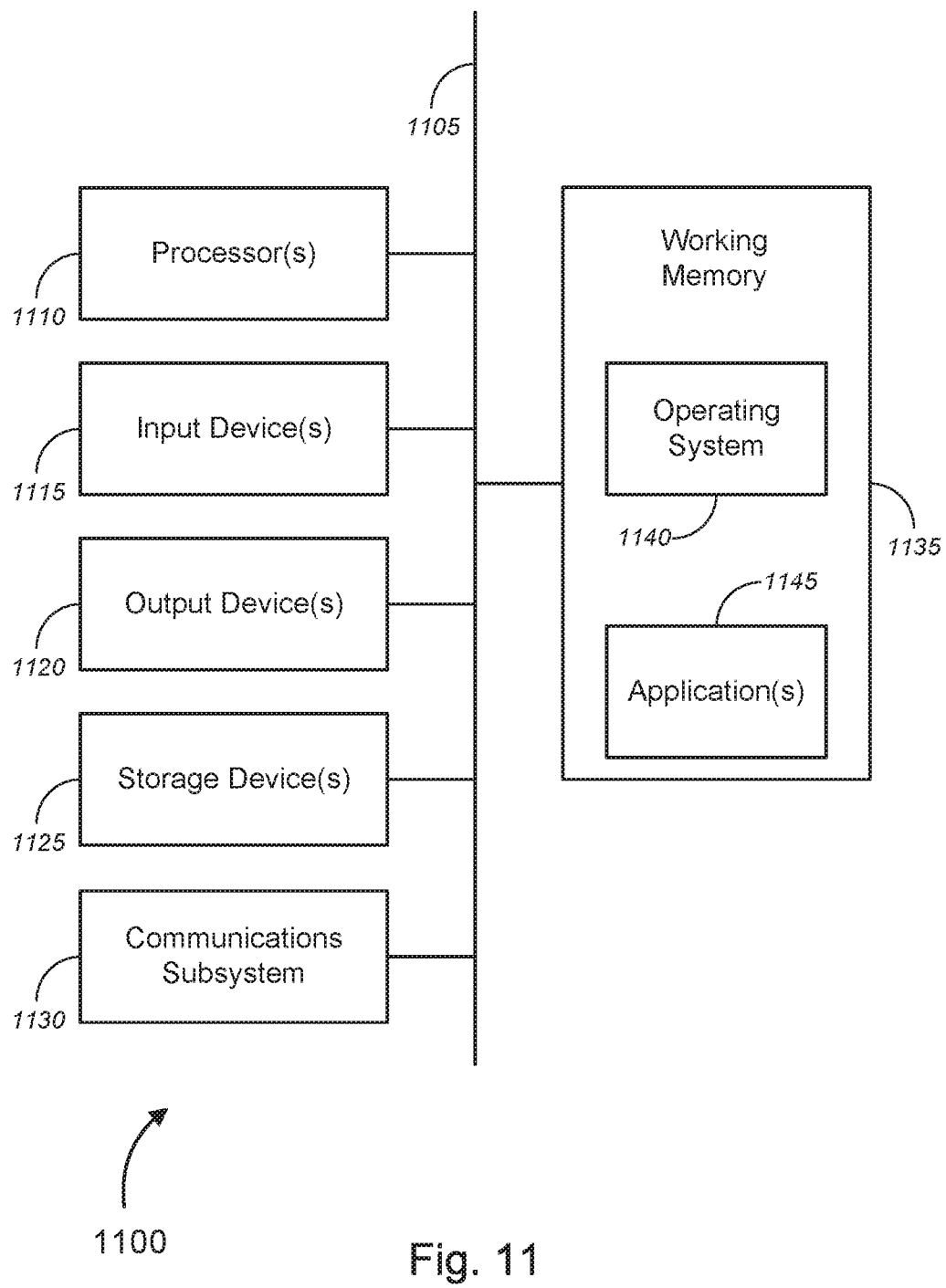
FIG. 11 is a block diagram illustrating an exemplary computer or system hardware architecture, in accordance with various embodiments.

FIG. 11 is a block diagram illustrating an exemplary computer or system hardware architecture, in accordance with various embodiments. FIG. 11 provides a schematic illustration of one embodiment of a computer system 1100 of the service provider system hardware that can perform the methods provided by various other embodiments, as described herein, and/or can perform the functions of computer or hardware system (i.e., gateway devices 105, 145, 305, 305', 305", 305''', 405, 505, 805, and 955, user devices/systems 110, 150, 250, 310a-310n, 550, and 945, hypervisors/containers 115 and 155, nodes 120a-120n and 160a-160n, network nodes 135, 175, 205, and 330, network gateways 185, 335, 410, and 985, computing or compute systems 190a, 190b, 355, 540, and 545, servers 535 and 635, telemetry controller 605, NID telemetry collector 630, provider infrastructure 815, gateway controller 950, OTT or centralized system 960, central system 965, voice control system 970, management agent 975, service provider orchestrator 980, etc.), as described above. It should be noted that FIG. 11 is meant only to provide a generalized illustration of various components, of which one or more (or none) of each may be utilized as appropriate. FIG. 11, therefore, broadly illustrates how individual system elements may be implemented in a relatively separated or relatively more integrated manner.

The computer or hardware system 1100—which might represent an embodiment of the computer or hardware system (i.e., gateway devices 105, 145, 305, 305', 305", 305''', 405, 505, 805, and 955, user devices/systems 110, 150, 250, 310a-310n, 550, and 945, hypervisors/containers 115 and 155, nodes 120a-120n and 160a-160n, network nodes 135, 175, 205, and 330, network gateways 185, 335, 410, and 985, computing or compute systems 190a, 190b, 355, 540, and 545, servers 535 and 635, telemetry controller 605, NID telemetry collector 630, provider infrastructure 815, gateway controller 950, OTT or centralized system 960, central system 965, voice control system 970, management agent 975, service provider orchestrator 980, etc.), as described above with respect to FIGS. 1-10—is shown comprising hardware elements that can be electrically coupled via a bus 1105 (or may otherwise be in communication, as appropriate). The hardware elements may include one or more processors 1110, including, without limitation, one or more general-purpose processors and/or one or more special-purpose processors (such as microprocessors, digital signal processing chips, graphics acceleration processors, and/or the like); one or more input devices 1115, which can include, without limitation, a mouse, a keyboard and/or the like; and one or more output devices 1120, which can include, without limitation, a display device, a printer, and/or the like.

The computer or hardware system 1100 may further include (and/or be in communication with) one or more storage devices 1125, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including, without limitation, various file systems, database structures, and/or the like.

The computer or hardware system 1100 might also include a communications subsystem 1130, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 1130 may permit data to be exchanged with a network (such as the network described below, to name one example), with other computer or hardware systems, and/or with any other devices described herein. In many embodiments, the computer or hardware system 1100 will further comprise a working memory 1135, which can include a RAM or ROM device, as described above.

The computer or hardware system 1100 also may comprise software elements, shown as being currently located within the working memory 1135, including an operating system 1140, device drivers, executable libraries, and/or other code, such as one or more application programs 1145, which may comprise computer programs provided by various embodiments (including, without limitation, hypervisors, containers, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 1125 described above. In some cases, the storage medium might be incorporated within a computer system, such as the system 1100. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer or hardware system 1100 and/or might take the form of source and/or installable code, which, upon compilation and/or installation on the computer or hardware system 1100 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 1100) to perform methods in accordance with various embodiments of the invention. According to a set of embodiments, some or all of the procedures of such methods are performed by the computer or hardware system 1100 in response to processor 1110 executing one or more sequences of one or more instructions (which might be incorporated into the operating system 1140 and/or other code, such as an application program 1145) contained in the working memory 1135. Such instructions may be read into the working memory 1135 from another computer readable medium, such as one or more of the storage device(s) 1125. Merely by way of example, execution of the sequences of instructions contained in the working memory 1135 might cause the processor(s) 1110 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 1100, various computer readable media might be involved in providing instructions/code to processor(s) 1110 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 1125.

Volatile media includes, without limitation, dynamic memory, such as the working memory 1135. In some alternative embodiments, a computer readable medium may take the form of transmission media, which includes, without limitation, coaxial cables, copper wire and fiber optics, including the wires that comprise the bus 1105, as well as the various components of the communication subsystem 1130 (and/or the media by which the communications subsystem 1130 provides communication with other devices). In an alternative set of embodiments, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 1110 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 1100. These signals, which might be in the form of electromagnetic signals, acoustic signals, optical signals, and/or the like, are all examples of carrier waves on which instructions can be encoded, in accordance with various embodiments of the invention.

The communications subsystem 1130 (and/or components thereof) generally will receive the signals, and the bus 1105 then might carry the signals (and/or the data, instructions, etc. carried by the signals) to the working memory 1135, from which the processor(s) 1105 retrieves and executes the instructions. The instructions received by the working memory 1135 may optionally be stored on a storage device 1125 either before or after execution by the processor(s) 1110.

Figure 12:
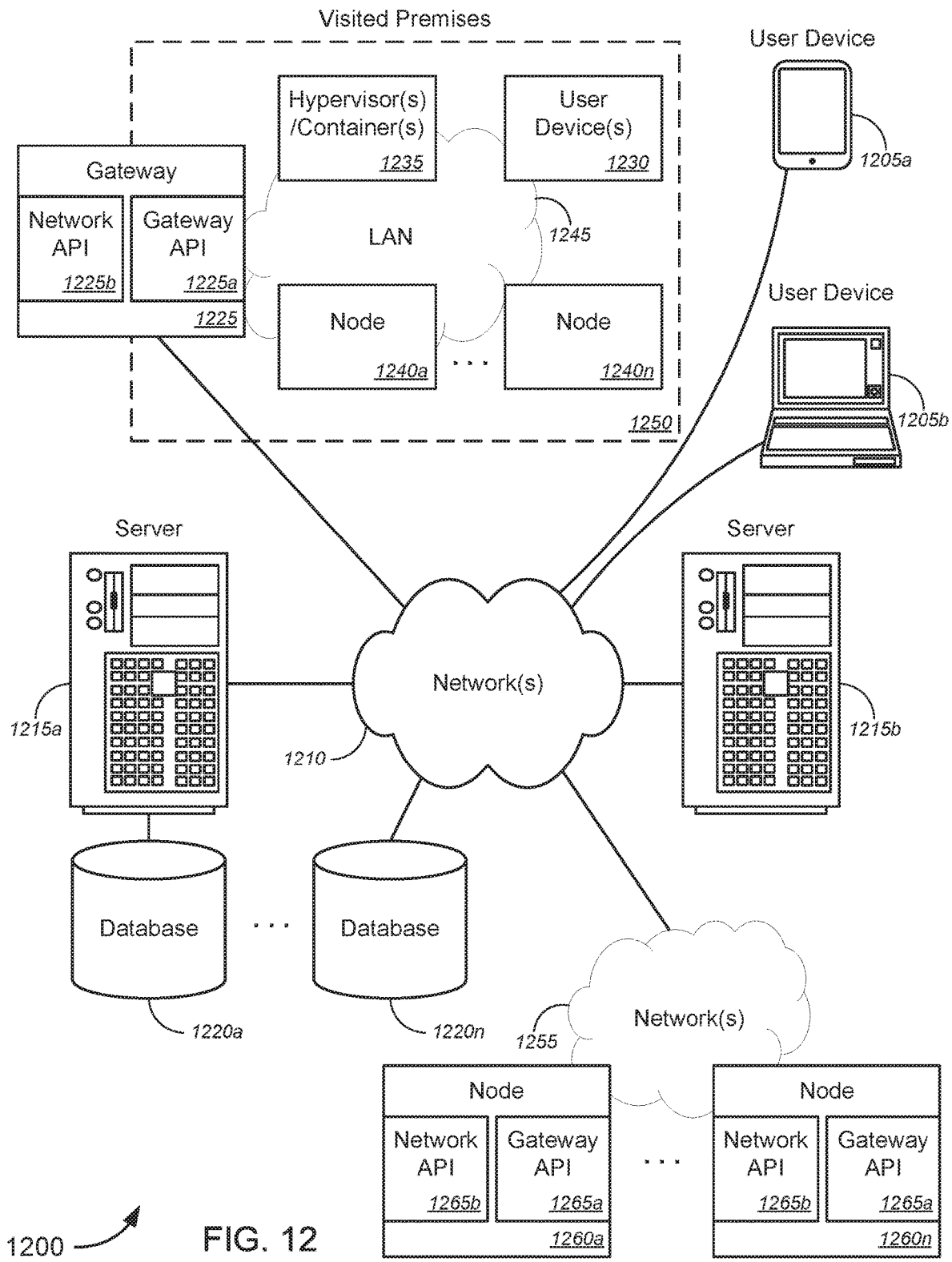
FIG. 12 is a block diagram illustrating a networked system of computers, computing systems, or system hardware architecture, which can be used in accordance with various embodiments.

As noted above, a set of embodiments comprises methods and systems for implementing network experience shifting, and, more particularly, to methods, systems, and apparatuses for implementing network experience shifting using shared objects. FIG. 12 illustrates a schematic diagram of a system 1200 that can be used in accordance with one set of embodiments. The system 1200 can include one or more user computers, user devices, or customer devices 1205. A user computer, user device, or customer device 1205 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 1205 can also have any of a variety of applications, including one or more applications configured to perform methods provided by various embodiments (as described above, for example), as well as one or more office applications, database client and/or server applications, and/or web browser applications. Alternatively, a user computer, user device, or customer device 1205 can be any other electronic device, such as a thin-client computer, Internet-enabled mobile telephone, and/or personal digital assistant, capable of communicating via a network (e.g., the network(s) 1210 described below) and/or of displaying and navigating web pages or other types of electronic documents. Although the exemplary system 1200 is shown with two user computers, user devices, or customer devices 1205, any number of user computers, user devices, or customer devices can be supported.

Certain embodiments operate in a networked environment, which can include a network(s) 1210. The network(s) 1210 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 1210 (as well as each of network(s) 1245 and 1255) (similar to network(s) 125, 140, 165, 180, 320, 350, 420, 430, 440, 450, 525, 530, 830, 835, and 840 of FIGS. 1, 3-5, and 8, or the like) can each include a local area network ("LAN"), including, without limitation, a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 1215. Each of the server computers 1215 may be configured with an operating system, including, without limitation, any of those discussed above, as well as any commercially (or freely) available server operating systems. Each of the servers 1215 may also be running one or more applications, which can be configured to provide services to one or more clients 1205 and/or other servers 1215.

Merely by way of example, one of the servers 1215 might be a data server, a web server, a cloud computing device(s), or the like, as described above. The data server might include (or be in communication with) a web server, which can be used, merely by way of example, to process requests for web pages or other electronic documents from user computers 1205. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 1205 to perform methods of the invention.

The server computers 1215, in some embodiments, might include one or more application servers, which can be configured with one or more applications accessible by a client running on one or more of the client computers 1205 and/or other servers 1215. Merely by way of example, the server(s) 1215 can be one or more general purpose computers capable of executing programs or scripts in response to the user computers 1205 and/or other servers 1215, including, without limitation, web applications (which might, in some cases, be configured to perform methods provided by various embodiments). Merely by way of example, a web application can be implemented as one or more scripts or programs written in any suitable programming language, such as Java™, C, C #™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 1205 and/or another server 1215. In some embodiments, an application server can perform one or more of the processes for implementing network experience shifting, and, more particularly, to methods, systems, and apparatuses for implementing network experience shifting using shared objects, as described in detail above. Data provided by an application server may be formatted as one or more web pages (comprising HTML, JavaScript, etc., for example) and/or may be forwarded to a user computer 1205 via a web server (as described above, for example). Similarly, a web server might receive web page requests and/or input data from a user computer 1205 and/or forward the web page requests and/or input data to an application server. In some cases, a web server may be integrated with an application server.

In accordance with further embodiments, one or more servers 1215 can function as a file server and/or can include one or more of the files (e.g., application code, data files, etc.) necessary to implement various disclosed methods, incorporated by an application running on a user computer 1205 and/or another server 1215. Alternatively, as those skilled in the art will appreciate, a file server can include all necessary files, allowing such an application to be invoked remotely by a user computer, user device, or customer device 1205 and/or server 1215.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 1220a-1220n (collectively, "databases 1220"). The location of each of the databases 1220 is discretionary: merely by way of example, a database 1220a might reside on a storage medium local to (and/or resident in) a server 1215a (and/or a user computer, user device, or customer device 1205). Alternatively, a database 1220n can be remote from any or all of the computers 1205, 1215, so long as it can be in communication (e.g., via the network 1210) with one or more of these. In a particular set of embodiments, a database 1220 can reside in a storage-area network ("SAN") familiar to those skilled in the art. (Likewise, any necessary files for performing the functions attributed to the computers 1205, 1215 can be stored locally on the respective computer and/or remotely, as appropriate.) In one set of embodiments, the database 1220 can be a relational database, such as an Oracle database, that is adapted to store, update, and retrieve data in response to SQL-formatted commands. The database might be controlled and/or maintained by a database server, as described above, for example.

According to some embodiments, system 1200 might further comprise gateway device 1225 (similar to gateway devices 105, 145, 305, 305', 305", 305''', 405, 505, 805, and 955 of FIGS. 1, 3-5, 8, and 9, or the like), one or more user devices 1230 (similar to user devices/systems 110, 150, 250, 310a-310n, 550, and 945 of FIGS. 1-3, 5, and 9, respectively, or the like), one or more first nodes 1240a-1240n (similar to nodes 120a-120n and 160a-160n of FIG. 1, or the like), and local area network ("LAN") 1245 (similar to LAN 125, 165, 320, 420, 530, and 830, of FIGS. 1, 3-5, and 8, respectively, or the like), each of which are located at visited premises 1250 (similar to visited premises 125 of FIG. 1, or the like). System 1200 might further comprise network(s) 1255 (similar to network(s) 140, 180, 350, 430, 440, 450, 525, 835, and 840 of FIGS. 1, 3-5, and 8, of the like) and one or more second nodes 1260a-1260n (similar to network nodes 135, 175, 205, and 330 of FIGS. 1-3, or the like) disposed in network 1255. Gateway application programming interface ("API") 1225a (similar to gateway API 105a, 145a, 305a, and 905 of FIGS. 1, 3, and 9, respectively, or the like) and network API 1225b (similar to network API 105b, 145b, 305b, or 905 of FIGS. 1, 3, and 9, respectively, or the like) may be disposed within gateway 1225, while gateway API 1265a (similar to gateway API 135a, 175a, 330a, and 905 of FIGS. 1, 3, and 9, respectively, or the like) and network API 1160n (similar to network API 135b, 175b, 330b, and 905 of FIGS. 1, 3, and 9, respectively, or the like) may be disposed within each of second nodes 1260a-1260n, respectively. Although not shown, each of at least one of first nodes 1240a-1240n might comprise a gateway API (like gateway API 1225a or the like) and a network API (like network API 1225b or the like).

In operation, a computing system (which might be embodied by server(s) 1215, gateway 1225, first node(s) 1240, or second node(s) 1260, and/or the like) might receive, via a first network access device (e.g., gateway device 1225 or the like) in a second network (e.g., LAN 1245 or the like), a request from a first user device (e.g., user device(s) 1230 or hypervisor(s)/container(s) 1235, or the like) to establish roaming network access, a first user of the first user device being associated with a second network access device in a first network (e.g., gateway 105 in LAN 125 of system 100 of FIG. 1, or the like) and being unassociated with the first network access device, the second network access device being located in a different geographical location from the first network access device; might authenticate the first user; might determine whether the first user is associated with the second network access device; might determine whether the first user is authorized to access at least one of data, content, profiles, software applications, one or more first virtual network functions ("VNFs"), or one or more subscribed-to services that are accessible by the second network access device; might receive customer network telemetry data via a gateway application programming interface ("API"), the customer network telemetry data comprising information regarding a visited local area network ("LAN") associated with the first network access device and information regarding the first network access device (i.e., receive customer network telemetry data of LAN 1245 via gateway API 1225a or 1265a); might receive service provider network telemetry data via a network API, the service provider network telemetry data comprising at least one of information regarding the first network, information regarding at least one first network equipment in the first network, information regarding the second network, or information regarding at least one second network equipment in the second network (i.e., receive service provider network telemetry data via a network API 1225b or 1265b, or the like).

Based on a determination that the first user is associated with the second network access device and that the first user is authorized to access at least one of data, content, profiles, software applications, one or more first VNFs, or one or more subscribed-to services that are accessible by the second network access device, the computing system might determine whether at least one of the visited LAN or the first network access device comprises at least one of hardware, software, network functionality, or configuration that is capable of simulating an interface environment of at least one of a home LAN that is associated with the first user, a work LAN that is associated with the first user, or the second network access device. Based on a determination that at least one of the visited LAN or the first network access device comprises at least one of hardware, software, network functionality, or configuration that is capable of simulating an interface environment of at least one of the home LAN that is associated with the first user, the work LAN that is associated with the first user, or the second network access device, the computing system might configure the at least one of the visited LAN or the first network access device to simulate the interface environment of the at least one of the home LAN that is associated with the first user, the work LAN that is associated with the first user, or the second network access device.

Alternatively, or additionally, a computing system (which might be embodied by server(s) 1215, gateway 1225, first node(s) 1240, or second node(s) 1260, and/or the like) might receive customer network telemetry data of LAN 1245 via a gateway API 1225*a* or 1265*a*, might receive service provider network telemetry data via a network API 1225*b* or 1265*b*, and might analyze the received customer network telemetry data of network(s) 1210 or 1255 (or other network(s)) and the received service provider network telemetry data to determine one or more first instructions to send to the gateway device 1225 or the one or more first nodes 1240 in the LAN 1245 to cause the gateway device 1225 or the one or more first nodes 1240 to perform at least one first action and to determine one or more second instructions to send to the one or more second nodes 1260 to cause the one or more second nodes 1260 to perform at least one second action.

Subsequently, the computing system might send the one or more first instructions to the gateway device 1225 or the one or more first nodes 1240 in the LAN 1245, the one or more first instructions causing the gateway device 1225 or the one or more first nodes 1240 to perform at least one first action (e.g., to optimize LAN 1245, to add automation capabilities to LAN 1245, to add integration capabilities to LAN 1245, to perform advanced decision making, to perform actions in response to analysis of at least one of the customer network telemetry data or the service provider network telemetry data, to restrict traffic to LAN 1245, to restrict traffic from LAN 1245, to redirect traffic to LAN 1245, to redirect traffic from LAN 1245, to send at least one notification through LAN 1245, to execute a software application in LAN 1245, or to stop/prevent execution of a software application in LAN 1245, and/or the like). The computing system might also send the one or more second instructions to the one or more second nodes 1260 (in the WAN or other network), the one or more second instructions causing the one or more second nodes 1260 to perform at least one second action (e.g., to optimize the WAN or other network(s), to add automation capabilities to the WAN or other network(s), to add integration capabilities to the WAN or other network(s), to perform advanced decision making, to perform actions in response to analysis of at least one of the customer network telemetry data or the service provider network telemetry data, to restrict traffic to the WAN or other network(s), to restrict traffic from the WAN or other network(s), to redirect traffic to the WAN or other network(s), to redirect traffic from the WAN or other network(s), to send at least one notification through the WAN or other network(s), to execute a software application in the WAN or other network(s), or to stop/prevent execution of a software application in the WAN or other network(s), and/or the like).

Alternatively, the computing system (which might be embodied by server(s) 1215, gateway 1225, first node(s) 1240, or second node(s) 1260, and/or the like) might receive first network telemetry data of a first network via a gateway API (e.g., gateway API 1225*a* or 1265*a* or the like), might receive second network telemetry data of one or more second networks via a network API (e.g., network API 1225*b* or 1265*b* or the like), and might analyze the received first network telemetry data and the received second network telemetry data to determine one or more first instructions to send to the first network (e.g., one of LAN 1245, a WAN, a service provider network, an intermediate network, or other network(s), or the like) to cause one or more first nodes (e.g., nodes 1240, nodes 1260, or the like) to perform at least one first action and to determine one or more second instructions to send to each of the one or more second networks (e.g., one or more others of the LAN 1245, the WAN, the service provider network, the intermediate network, or other network(s), or the like) to cause one or more second nodes (e.g., nodes 1260, nodes 1240, or the like) to perform at least one second action.

Subsequently, the computing system might send the one or more first instructions to the one or more first nodes in the first network, the one or more first instructions causing the one or more first nodes to perform at least one first action (e.g., to optimize the first network, to add automation capabilities to the first network, to add integration capabilities to the first network, to perform advanced decision making, to perform actions in response to analysis of at least one of the first network telemetry data or the second network telemetry data, to restrict traffic to the first network, to restrict traffic from the first network, to redirect traffic to the first network, to redirect traffic from the first network, to send at least one notification through the first network, to execute a software application in the first network, or to stop/prevent execution of a software application in the first network, and/or the like). The computing system might also send the one or more second instructions to the one or more second nodes in the one or more second networks, the one or more second instructions causing the one or more second nodes to perform at least one second action (e.g., to optimize the second network(s), to add automation capabilities to the second network(s), to add integration capabilities to the second network(s), to perform advanced decision making, to perform actions in response to analysis of at least one of the first network telemetry data or the second network telemetry data, to restrict traffic to the second network(s), to restrict traffic from the second network(s), to redirect traffic to the second network(s), to redirect traffic from the second network(s), to send at least one notification through the second network(s), to execute a software application in the second network(s), or to stop/prevent execution of a software application in the second network(s), and/or the like).

These and other functions of the system 1200 (and its components) are described in greater detail above with respect to FIGS. 1-10.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
   receiving, at a network node in a first network and via a first network access device in a second network, a request from a first user device to establish roaming network access, a first user of the first user device being associated with a second network access device in the first network and being unassociated with the first network access device, the second network access device being located in a different geographical location from the first network access device;
   authenticating, with the network node, the first user;
   receiving, with the network node, customer network telemetry data via a gateway application programming interface ("API"), the customer network telemetry data comprising information regarding the second network as a visited local area network ("LAN") associated with the first network access device and information regarding the first network access device;
   receiving, with the network node, service provider network telemetry data via a network API, the service provider network telemetry data comprising at least one of information regarding the first network, information regarding at least one first network equipment in the first network, information regarding the second network, or information regarding at least one second network equipment in the second network;
   determining, with the network node, whether the first user is associated with the second network access device;
   determining, with the network node, whether the first user is authorized to access at least one of data, content, profiles, software applications, one or more first virtual network functions ("VNFs"), or one or more subscribed-to services that are accessible by the second network access device;
   based on a determination that the first user is associated with the second network access device and that the first user is authorized to access at least one of data, content, profiles, software applications, one or more first VNFs, or one or more subscribed-to services that are accessible by the second network access device, establishing, with the network node, a secure private LAN between the first network access device and the second network access device over the first network and the second network;
   based on a determination that the first user is associated with the second network access device and that the first user is authorized to access at least one of data, content, profiles, software applications, one or more first VNFs, or one or more subscribed-to services that are accessible by the second network access device, determining, with the network node, whether at least one of the visited LAN or the first network access device comprises at least one of hardware, software, network functionality, or configuration that is capable of simulating an interface environment of at least one of the first network or the second network access device; and
   based on a determination that at least one of the visited LAN or the first network access device comprises at least one of hardware, software, network functionality, or configuration that is capable of simulating an interface environment of at least one of the first network or the second network access device, configuring, with the network node, the at least one of the visited LAN or the first network access device to simulate the interface environment of the at least one of the first network or the second network access device.

2. The method of claim 1, wherein the network node comprises at least one of a gateway device, a network switch, a network functions virtualization ("NFV") orchestrator, a NFV entity, or a software defined network ("SDN") controller, wherein the NFV entity comprises at least one of a NFV orchestrator, a network functions virtualization infrastructure ("NFVI") system, a NFV management and orchestration ("MANO") system, a VNF manager ("VNFM"), a NFV resource manager, a virtualized infrastructure manager ("VIM"), a virtual machine ("VM"), a macro orchestrator, or a domain orchestrator.

3. The method of claim 1, wherein the first user device comprises one of a tablet computer, a smart phone, a mobile phone, a portable gaming device, a laptop computer, a portable hypervisor, a modem, a radio device, or a token chip device.

4. The method of claim 1, wherein the first network access device and the second network access device each comprises at least one of a customer premises equipment ("CPE"), a router, a switch, a network element, a demarcation device, a WiFi gateway device, a hypervisor platform, one or more virtual machine-based host machines, or a network node capable of hosting a hypervisor or a container, wherein the CPE comprises at least one of an optical network terminal ("ONT"), a network interface device ("NID"), an enhanced NID ("eNID"), a residential gateway ("RG") device, a business gateway ("BG") device, a virtual gateway ("vG") device, an integrated cable modem/gateway, an integrated xDSL modem/gateway, a combination copper access device and optical access device, an integrated radio/gateway, or an integrated transceiver gateway device.

5. The method of claim 1, wherein the first network and the second network are associated with one of the same network service provider or different network service providers.

6. The method of claim 1, further comprising:
   providing, with the network node, one or more second VNFs to at least one of one or more hypervisors or one or more containers that are in communication with the first network access device and executing instances of the one or more second VNFs on the at least one of the one or more hypervisors or the one or more containers, wherein each of the at least one of the one or more hypervisors or the one or more containers comprises a compute resource, a memory, and a storage; and establishing, with the network node, access connection to a data store by executing the instances of the one or more second VNFs on the at least one of the one or more hypervisors or the one or more containers, the data store containing the at least one of data, content, profiles, software applications, one or more first VNFs, or network configuration information for one or more subscribed-to services that are accessible by the second network access device.

7. The method of claim 6, wherein the at least one of the one or more hypervisors or the one or more containers is one of integrated with the first network access device, communicatively coupled to a host port of the first network access device, communicatively coupled to a universal serial bus ("USB") port of the first network access device, communicatively coupled to a local area network ("LAN") port of the first network access device, or communicatively coupled to a communication port of the first network access device that is different from any of the host port, the USB port, and the LAN port.

8. The method of claim 6, wherein the at least one of the one or more hypervisors or the one or more containers and the first user device are associated with the first user and unassociated with the first network access device or any network nodes in the second network.

9. The method of claim 1, wherein authenticating, with the network node, the first user comprises:
establishing a communication link with a portal;
receiving, at the portal, authentication information from at least one of the first user or the first user device; and
authenticating, via the portal, the first user based on the received authentication information.

10. The method of claim 1, wherein the request from the first user device is automatically sent from the first user device via the first network access device, without user input from the first user, wherein the first user device and the first network access device communicate with each other using at least one of machine-to-machine ("M2M") communication, M2M protocols, Internet of Things ("IoT") communication, IoT protocols, or IoT proxy functions.

11. The method of claim 1, further comprising, in response to determining that the first user is authorized to access one or more subscribed-to services that are accessible by the second network access device:
determining, with the network node, whether implementation of the one or more subscribed-to services exceeds physical limitations of the first network access device;
based on a determination that implementation of the one or more subscribed-to services is within capabilities of the first network access device, reconfiguring, with the network node, at least one of network configurations or network settings to provide the first user with the one or more subscribed-to services via the first network access device; and
based on a determination that implementation of the one or more subscribed-to services exceeds physical limitations of the first network access device, reconfiguring, with the network node, at least one of network configurations or network settings to provide the first user with the one or more subscribed-to services via the first network access device, up to the limits of the first network access device.

12. The method of claim 11, further comprising:
based on a determination that the first user device is no longer in communication with the first network access device, reverting, with the network node, the at least one of network configurations or network settings to previous configurations or settings.

13. The method of claim 1, wherein receiving the customer network telemetry data via the gateway API comprises receiving, with the network node, customer network telemetry data via the gateway API by pulling the customer network telemetry data from the one or more first nodes of the LAN via the gateway API, and wherein receiving the service provider network telemetry data via the network API comprises receiving, with the network node, service provider network telemetry data via the network API by pulling the service provider network telemetry data from the one or more second nodes of each of the one or more service provider networks via the network API.

14. The method of claim 1, wherein the customer network telemetry data are published to a first repository by at least one first node of the one or more first nodes in the LAN, wherein the service provider network telemetry data are published to a second repository by at least one second node of the one or more second nodes in each of the one or more service provider networks, wherein receiving the customer network telemetry data via the gateway API comprises receiving, with the network node, customer network telemetry data via the gateway API by subscribing to the first repository, and wherein receiving the service provider network telemetry data via the network API comprises receiving, with the network node, service provider network telemetry data via the network API by subscribing to the second repository.

15. The method of claim 1, wherein the customer network telemetry data and the service provider network telemetry data each comprises at least one of service operations, administration, and management ("Service OAM") data, service activation testing ("SAT") data, Iperf network performance measurement and tuning data, real-time statistics data, transmitted frame information, received frame information, transmitted packet information, received packet information, information regarding a processing unit of the gateway device, information regarding processing units of each of the one or more first nodes, information regarding processing units of each of the one or more second nodes, alarm indication signal ("AIS") data, data regarding whether one or more nodes are powered, data regarding whether one or more nodes are connected, device identification information of each of one or more nodes, device capability information of each of one or more nodes, resource consumption information for each of one or more network resources, or resource consumption information by each of one or more devices.

16. A computing system in a first network, comprising:
at least one processor; and
a non-transitory computer readable medium communicatively coupled to the at least one processor, the non-transitory computer readable medium having stored thereon computer software comprising a set of instructions that, when executed by the at least one processor, causes the computing system to:
receive, via a first network access device in a second network, a request from a first user device to establish roaming network access, a first user of the first user device being associated with a second network access device in the first network and being unassociated with the first network access device, the second network access device being located in a different geographical location from the first network access device;

authenticate the first user;

determine whether the first user is associated with the second network access device;

determine whether the first user is authorized to access at least one of data, content, profiles, software applications, one or more first virtual network functions ("VNFs"), or one or more subscribed-to services that are accessible by the second network access device;

based on a determination that the first user is associated with the second network access device and that the first user is authorized to access at least one of data, content, profiles, software applications, one or more first VNFs, or one or more subscribed-to services that are accessible by the second network access device, establishing, with the network node, a secure private LAN between the first network access device and the second network access device over the first network and the second network;

receive customer network telemetry data via a gateway application programming interface ("API"), the customer network telemetry data comprising information regarding the second network as a visited local area network ("LAN") associated with the first network access device and information regarding the first network access device;

receive service provider network telemetry data via a network API, the service provider network telemetry data comprising at least one of information regarding the first network, information regarding at least one first network equipment in the first network, information regarding the second network, or information regarding at least one second network equipment in the second network;

based on a determination that the first user is associated with the second network access device and that the first user is authorized to access at least one of data, content, profiles, software applications, one or more first VNFs, or one or more subscribed-to services that are accessible by the second network access device, determine whether at least one of the visited LAN or the first network access device comprises at least one of hardware, software, network functionality, or configuration that is capable of simulating an interface environment of at least one of the first network or the second network access device; and based on a determination that at least one of the visited LAN or the first network access device comprises at least one of hardware, software, network functionality, or configuration that is capable of simulating an interface environment of at least one of the first network or the second network access device, configure the at least one of the visited LAN or the first network access device to simulate the interface environment of the at least one of the first network or the second network access device.

17. A system, comprising:

one or more first nodes in a visited local area network ("LAN"), each first node comprising:

at least one first processor; and a first non-transitory computer readable medium communicatively coupled to the at least one first processor, the first non-transitory computer readable medium having stored thereon computer software comprising a first set of instructions that, when executed by the at least one first processor, causes the first node to:

obtain customer network telemetry data comprising information regarding the visited LAN and information regarding a gateway that connects the one or more user devices to one or more service provider networks; and send the customer network telemetry data to a network node in a first network via a gateway application programming interface ("API");

one or more second nodes in each of the one or more service provider networks, each second node comprising:

at least one second processor; and a second non-transitory computer readable medium communicatively coupled to the at least one second processor, the second non-transitory computer readable medium having stored thereon computer software comprising a second set of instructions that, when executed by the at least one second processor, causes the second node to:

obtain service provider network telemetry data comprising information regarding a corresponding one of the one or more service provider networks and information regarding at least one network equipment in the corresponding one of one or more service provider networks; and send the service provider network telemetry data to the network node via a network API; and the network node, comprising:

at least one third processor; and a third non-transitory computer readable medium communicatively coupled to the at least one third processor, the third non-transitory computer readable medium having stored thereon computer software comprising a third set of instructions that, when executed by the at least one third processor, causes the network node to:

receive, via a first network access device in a second network as the visited LAN, a request from a first user device to establish roaming network access, a first user of the first user device being associated with a second network access device in the first network and being unassociated with the first network access device, the second network access device being located in a different geographical location from the first network access device;

authenticate the first user;

determine whether the first user is associated with the second network access device;

determine whether the first user is authorized to access at least one of data, content, profiles, software applications, one or more first virtual network functions ("VNFs"), or one or more subscribed-to services that are accessible by the second network access device;

based on a determination that the first user is associated with the second network access device and that the first user is authorized to access at least one of data, content, profiles, software applications, one or more first VNFs, or one or more subscribed-to services that are accessible by the second network access device, establishing, with the network node, a secure private LAN between the first network access device and the second network access device over the first network and the second network;

receive customer network telemetry data via the gateway API;

receive service provider network telemetry data via the network API;

based on a determination that the first user is associated with the second network access device and that the first user is authorized to access at least one of data, content, profiles, software applications, one or more first VNFs, or one or more subscribed-to services that are accessible by the second network access device, determine whether at least one of the visited LAN or the first network access device comprises at least one of hardware, software, network functionality, or configuration that is capable of simulating an interface environment of at least one of the first network or the second network access device; and based on a determination that at least one of the visited LAN or the first network access device comprises at least one of hardware, software, network functionality, or configuration that is capable of simulating an interface environment of at least one of the the first network or the second network access device, configure the at least one of the visited LAN or the first network access device to simulate the interface environment of the at least one of the the first network or the second network access device.

\* \* \* \* \*